US011290998B2

(12) United States Patent
Pan et al.

(10) Patent No.: US 11,290,998 B2
(45) Date of Patent: Mar. 29, 2022

(54) RANDOM ACCESS IN NEW RADIO (NR) AND OTHER BEAMFORMING SYSTEMS

(71) Applicant: IDAC HOLDINGS, INC., Wilmington, DE (US)

(72) Inventors: Kyle Jung-Lin Pan, St. James, NY (US); Janet A. Stern-Berkowitz, Little Neck, NY (US); Moon-il Lee, Melville, NY (US); Fengjun Xi, San Diego, CA (US)

(73) Assignee: IDAC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/085,903

(22) Filed: Oct. 30, 2020

(65) Prior Publication Data
US 2021/0120535 A1 Apr. 22, 2021

Related U.S. Application Data

(63) Continuation of application No. 16/337,057, filed as application No. PCT/US2017/054086 on Sep. 28, 2017, now abandoned.
(Continued)

(51) Int. Cl.
*H04W 72/04* (2009.01)
*H04W 16/28* (2009.01)
(Continued)

(52) U.S. Cl.
CPC ......... *H04W 72/044* (2013.01); *H04W 16/28* (2013.01); *H04W 56/001* (2013.01); *H04W 72/005* (2013.01)

(58) Field of Classification Search
CPC .............. H04W 72/044; H04W 16/28; H04W 56/001; H04W 72/005; H04W 74/0833;
(Continued)

(56) References Cited

U.S. PATENT DOCUMENTS 10,091,820 B2   10/2018   Yu et al.
2012/0077530 A1  3/2012   Wu et al.
(Continued)

FOREIGN PATENT DOCUMENTS

CN   103051413 A   4/2013
EP      3197186    7/2017
(Continued)

OTHER PUBLICATIONS

Rico-Alvarino, Alberto, et al. "An overview of 3GPP enhancements on machine to machine communications." IEEE Communications Magazine 54.6 (2016): 14-21. (Year: 2016).*
(Continued)

*Primary Examiner* — Sharad Rampuria
(74) *Attorney, Agent, or Firm* — Volpe Koenig

(57) ABSTRACT

A wireless transmit/receive unit (WTRU) may receive, from a base station, information concerning an association between synchronization signal/physical broadcast channel (SS/PBCH) block transmissions and physical random access channel (PRACH) resources. In an example, each SS/PBCH block transmission may be associated with a transmission beam of the base station. The WTRU may receive the SS/PBCH block transmissions and select one of the transmissions. Further, the WTRU may compare a reference signal received power (RSRP) associated with the selected transmission to a threshold. The WTRU may then determine between performing a random access procedure of a first type and a second type based on the comparison. Also, the WTRU may select a PRACH resource based on the selected transmission and the information concerning the association between the transmissions and the PRACH resources. Moreover, the WTRU may transmit a PRACH preamble, for the determined random access procedure, using the selected PRACH resource.

22 Claims, 17 Drawing Sheets

Related U.S. Application Data

(60) Provisional application No. 62/454,470, filed on Feb. 3, 2017, provisional application No. 62/443,319, filed on Jan. 6, 2017, provisional application No. 62/416,592, filed on Nov. 2, 2016, provisional application No. 62/400,980, filed on Sep. 28, 2016.

(51) Int. Cl.
*H04W 56/00* (2009.01)
*H04W 72/00* (2009.01)

(58) Field of Classification Search
CPC ............ H04W 74/004; H04W 72/0446; H04B 7/0695; H04B 7/2618
See application file for complete search history.

(56) References Cited

U.S. PATENT DOCUMENTS

| | | |
|---|---|---|
| 2012/0208541 A1 | 8/2012 | Luo et al. |
| 2013/0242951 A1 | 9/2013 | Lee et al. |
| 2014/0010178 A1 | 1/2014 | Yu et al. |
| 2014/0086173 A1* | 3/2014 | Sadeghi ............... H04W 72/042 370/329 |
| 2014/0177607 A1 | 6/2014 | Li et al. |
| 2015/0289219 A1 | 10/2015 | Kim et al. |
| 2015/0304995 A1 | 10/2015 | Yi et al. |
| 2015/0382205 A1 | 12/2015 | Lee et al. |
| 2016/0087706 A1 | 3/2016 | Guey et al. |
| 2016/0087707 A1 | 3/2016 | Guey et al. |
| 2016/0212737 A1 | 7/2016 | Jang et al. |
| 2018/0132252 A1 | 5/2018 | Islam et al. |
| 2018/0176065 A1 | 6/2018 | Deng et al. |
| 2018/0227867 A1 | 8/2018 | Park et al. |
| 2019/0104549 A1 | 4/2019 | Deng et al. |
| 2019/0174384 A1 | 6/2019 | Kim et al. |
| 2019/0238270 A1 | 8/2019 | Pan et al. |
| 2019/0387550 A1 | 12/2019 | Pan et al. |

FOREIGN PATENT DOCUMENTS

| | | |
|---|---|---|
| WO | 2011/120352 A1 | 10/2011 |
| WO | 2016/086144 | 6/2016 |

OTHER PUBLICATIONS

El Hattachi et al., "NGMN 5G White Paper," Version 1.0 (Feb. 2015).
Ericsson, "On the random access procedure," 3GPP TSG-RAN WG1 #86, R1-167059, Gothenburg, weden (Aug. 22-26, 2016).
Huawei et al., "Access mechanism for beam based appraoch," 3GPP TSG RAN WG1 Meeting #86, R1-166088, Gothenburg, Sweden (Aug. 22-26, 2016).
Interdigital Communications, "Consideration on SS Burst Design and Indication," 3GPP TSG RAN WG1 Meeting #88, R1-1702315, Athens, Greece (Feb. 13-17, 2017).
Interdigital Communications, "On NR-PBCH Transmission," 3GPP TSG RAN WG1 Meeting #88bis, R1-1705500, Spokane, USA (Apr. 3-7, 2017).
Interdigital Inc., "On NR Physical Broadcast Channel," 3GPP TSG RAN WG1 Meeting #89, R1-1708327, Hangzhou, P.R. China (May 15-19, 2017).
Interdigital Inc., "On NR-PBCH DMRS Design and Time Index Indication," 3GPP TSG RAN WG1 Meeting #90, R1-1714132, Prague, Czech Republic (Aug. 21-25, 2017).
Interdigital Inc., "On SS Block Time Index Indication in NR," 3GPP TSG RAN WG1 Meeting #89, R1-1708326, Hangzhou, P.R. China (May 15-19, 2017).
Interdigital, "Random access aspects for beam-based NR initial access," 3GPP TSG-RAN WG1 #86, R1-167333, Gothenburg, Sweden (Aug. 22-26, 2016).
International Telecommunciation Union, "IMT Vision—Framework and overall objectives of the future development of IMT for 2020 and beyond; M Series Mobile, radiodetermination, amateur and related satellite services," Recommendation ITU-R M.2083-0 (Sep. 2015).
Nokia et al., "Channel reciprocity support in NR," 3GPP TSG-RAN WG1 #86, R1-167282, Gothenburg, Sweden (Aug. 22-26, 2016).
NTT Docomo, Inc., "Design for RACH Procedure for NR," 3GPP TSG-RAN WG1 #86, R1-167378, Gothenburg, Sweden (Aug. 22-26, 2016).
Third Generation Partnership Project, "Technical Specification Group Radio Access Network; Study on Scenarios and Requirements for Next Generation Access Technologies; (Release 14)," 3GPP TR 38.913 V0.3.0 (Mar. 2016).
Third Generation Partnership Project, "Technical Specification Group Radio Access Network; Study on Scenarios and Requirements for Next Generation Access Technologies; (Release 14)," 3GPP TR 38.913 V0.4.0 (Jun. 2016).
Third Generation Partnership Project, "Technical Specification Group Radio Access Network; Study on Scenarios and Requirements for Next Generation Access Technologies; (Release 14)," 3GPP TR 38.913 V14.3.0 (Jun. 2017).
Third Generation Partnership Project, "Technical Specification Group Radio Access Network; Requirements for further advancements for Evolved Universal Terrestrial Radio Access (E-UTRA) (LTE-Advanced) (Release 14)," 3GPP TR 36.913 V14.0.0 (Mar. 2017).
Third Generation Partnership Project, "Technical Specification Group Radio Access Network; Requirements for further advancements for Evolved Universal Terrestrial Radio Access (E-UTRA) (LTE-Advanced) (Release 13)," 3GPP TR 36.913 V13.0.0 (Dec. 2015).
Third Generation Partnership Project, "Technical Specification Group Radio Access Network; Evolved Universal Terrestrial Radio Access (E-UTRA); Physical layer procedures (Release 13)," 3GPP TS 36.213 V13.2.0 (Jun. 2016).
Third Generation Partnership Project, "Technical Specification Group Radio Access Network; Evolved Universal Terrestrial Radio Access (E-UTRA); Physical layer procedures (Release 13)," 3GPP TS 36.213 V13.7.0 (Sep. 2017).
Third Generation Partnership Project, "Technical Specification Group Radio Access Network; Evolved Universal Terrestrial Radio Access (E-UTRA); Physical layer procedures (Release 14)," 3GPP TS 36.213 V14.4.0 (Sep. 2017).
Third Generation Partnership Project, "Technical Specification Group Radio Access Network; NR; Physical layer procedures for control (Release 15)," 3GPP TS 38.213 V1.0.0 (Sep. 2017).
Third Generation Partnership Project, "Technical Specification Group Radio Access Network; Evolved Universal Terrestrial Radio Access (E-UTRA); Physical channels and modulation (Release 13)," 3GPP TS 36.211 V13.7.1 (Sep. 2017).
Third Generation Partnership Project, "Technical Specification Group Radio Access Network; Evolved Universal Terrestrial Radio Access (E-UTRA); Physical channels and modulation (Release 14)," 3GPP TS 36.211 V14.4.0 (Sep. 2017).
Third Generation Partnership Project, Technical Specification Group Radio Access Network; Evolved Universal Terrestrial Radio Access (E-UTRA) and Evolved Universal Terrestrial Radio Access Network (E-UTRAN); Overall description; Stage 2 (Release 13)3GPP TS 36.300 V13.4.0 (Jun. 2016).
Third Generation Partnership Project, "Technical Specification Group Radio Access Network; Evolved Universal Terrestrial Radio Access (E-UTRA) and Evolved Universal Terrestrial Radio Access Network (EUTRAN); Overall description; Stage 2 (Release 13)," 3GPP TS 36.300 V13.9.0 (Sep. 2017).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.4.0 (Sep. 2017).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.2.0 (Jun. 2016).

(56) References Cited

OTHER PUBLICATIONS

Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.7.0 (Sep. 2017).

Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.4.0 (Sep. 2017).

Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.2.0 (Jun. 2016).

Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.7.0 (Sep. 2017).

Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.4.0 (Sep. 2017).

Third Generation Partnership Project, "Technical Specification Group Radio Access Network; NR; NR and NG-RAN Overall Description; Stage 2 (Release 15)," 3GPP TS 38.300 V1.0.0 (Sep. 2017).

Third Generation Partnership Project, "Technical Specification Group Radio Access Network; NR; Physical channels and modulation (Release 15),"3GPP TS 38.211 V1.0.0 (Sep. 2017).

Third Generation Partnership Project, "Technical Specification Group Radio Access Network; NR; Medium Access Control (MAC) protocol specification (Release 15)," 3GPP TS 38.321 V1.0.0 (Sep. 2017).

Third Generation Partnership Project, "Technical Specification Group Radio Access Network; NR; Radio Resource Control (RRC); Protocol specification (Release 15)," 3GPP TS 38.331 V0.1.0 (Oct. 2017).

Third Generation Partnership Project, "Technical Technical Specification Group Radio Access Network; Evolved Universal Terrestrial Radio Access (E-UTRA); Physical channels and modulation (Release 13)," 3GPP TS 36.211 V13.2.0 (Jun. 2016).

ZTE, "Overview of NR Initial Access," 3GPP TSG RAN WG1 Meeting #86, R1-166417, Gothenburg, Sweden (Aug. 22-26, 2016).

NTT Docomo et al., "Stage 2 Changes for Dual Connectivity," 3GPP TSG-RAN WG2 Meeting #85, R2-140049, Prague, Czech Republic (Feb. 10-14, 2014).

* cited by examiner

RANDOM ACCESS IN NEW RADIO (NR) AND OTHER BEAMFORMING SYSTEMS

CROSS REFERENCE TO RELATED APPLICATIONS

This application is a continuation of U.S. patent application Ser. No. 16/337,057, filed Mar. 27, 2019, which is based on the U.S. National Stage, under 35 U.S.C. § 371, of International Application No. PCT/US2017/054086, filed Sep. 28, 2017, which claims the benefit of U.S. Provisional Application No. 62/400,980 filed Sep. 28, 2016, U.S. Provisional Application No. 62/416,592 filed Nov. 2, 2016, U.S. Provisional Application No. 62/443,319 filed Jan. 6, 2017 and U.S. Provisional Application No. 62/454,470 filed Feb. 3, 2017, the contents of which are hereby incorporated by reference herein.

BACKGROUND

Several groups, including the International Telecommunications Union (ITU) Radio communication Sector (ITU-R), the Next Generation Mobile Networks (NGMN) Alliance and the 3$^{rd}$ Generation Partnership Project (3GPP) have set out general requirements for emerging 5$^{th}$ Generation (5G) systems, which may also be known as New Radio (NR). Based on these general requirements, a broad classification of the use cases for the emerging 5G systems can be depicted as follows: Enhanced Mobile Broadband (eMBB), Massive Machine Type Communications (mMTC) and Ultra Reliable and Low latency Communications (URLLC).

Different use cases may focus on different requirements such as higher data rate, higher spectrum efficiency, low power and higher energy efficiency, lower latency and higher reliability. A wide range of spectrum bands ranging from 700 megahertz (MHz) to 80 gigahertz (GHz) are being considered for a variety of deployment scenarios.

It is known that as a carrier frequency increases, the severe path loss becomes a crucial limitation to guarantee the sufficient coverage area. Transmission in millimeter wave systems could additionally suffer from non-line-of-sight losses, for example, diffraction loss, penetration loss, oxygen absorption loss, foliage loss and the like.

SUMMARY

A method and system for determining a beam reciprocity for a beam of a wireless transmit/receive unit (WTRU) are disclosed. A WTRU may determine a downlink (DL) beam for synchronization. Then, the WTRU may determine transmission reception point (TRP) transmit (TX)/receive (RX) beam correspondence information (BCI) using the determined DL beam. Further, the WTRU may determine a number of WTRU TX beams based on at least the TRP TX/RX BCI. Also, the WTRU may determine a set of WTRU TX beams based on at least the DL beam and the TRP TX/RX BCI, wherein determining the set includes determining one or more WTRU TX beam directions. In addition, the WTRU may transmit data using the determined set of WTRU TX beams.

In an example, the determination of the TRP TX/RX BCI may be based on a received TRP TX/RX BCI. In another example, the determination of the TRP TX/RX BCI may be based on at least one of a de-masking of a new radio (NR)-physical broadcast channel (PBCH) cyclic redundancy check (CRC) mask, one or more NR-PBCH resources, a NR-PBCH payload or a system information block (SIB).

In a further example, the determined DL beam may be for NR-PBCH reception from a TRP. In an additional example, the NR-PBCH may be an SS/PBCH. Also, the SS/PBCH may include an SS block time index.

In addition, the TX/RX BCI may include at least one of an indication of a correspondence type, a TX/RX beam width relationship or a TX/RX beam direction relationship. Also, the determination of the set of WTRU TX beams may be further based on the determined number of WTRU TX beams.

In an additional example, the WTRU may determine a preamble for a random access channel (RACH) procedure based on resources used by the determined DL beam. The WTRU may then to transmit the preamble. In an example, the preamble may be transmitted using preamble time resources mapped to a gNB RX beam.

In an example, a WTRU may receive, from a base station, information concerning an association between synchronization signal/PBCH (SS/PBCH) block transmissions and physical random access channel (PRACH) resources. In an example, each SS/PBCH block transmission may be associated with a transmission beam of the base station. The WTRU may receive the SS/PBCH block transmissions and select one of the transmissions. Further, the WTRU may compare a reference signal received power (RSRP) associated with the selected transmission to a threshold. The WTRU may then determine between performing a random access procedure of a first type and a second type based on the comparison. Also, the WTRU may select a PRACH resource based on the selected transmission and the information concerning the association between the transmissions and the PRACH resources. Moreover, the WTRU may transmit a PRACH preamble, for the determined random access procedure, using the selected PRACH resource.

In a further example, the random access procedure of the first type may be a two-step random access procedure and the random access procedure of the second type may be a four-step random access procedure. Also, the two-step random access procedure may include a first step including transmitting a physical uplink shared channel (PUSCH) transmission and a second step including receiving a message in a control channel search space. Further, wherein the PUSCH transmission may be a grant-less PUSCH transmission. In addition, the PUSCH transmission may include a radio resource control (RRC) connection request. Moreover, the first step of the two-step random access procedure further may include transmitting a random access preamble. In another example, the four-step random access procedure may include a first step including transmitting a random access preamble, a second step including receiving a random access response, a third step including transmitting a PUSCH transmission and a fourth step including receiving a contention resolution message.

In an additional example, the plurality of PRACH resources may include one or more of PRACH preambles, time resources and frequency resources. Also, the WTRU may determine an SS/PBCH block time index for the selected transmission. Further, the WTRU may determine a transmission beam for uplink transmission based on the selected SS/PBCH block transmission. The PRACH preamble may be transmitted using the determined transmission beam.

In an example, a WTRU may receive an SS/PBCH transmission. The WTRU may determine an SS/PBCH block index based on information associated with the SS/PBCH block transmission. Further, the WTRU may determine a PRACH resource based on the determined SS/PBCH block index. Also, the WTRU may transmit a signal using the determined PRACH resource.

In a further example, the information associated with the PBCH block may be derived from a demodulation reference signal (DMRS) sequence. Also, the information associated with the PBCH block may be derived from PBCH payload bits. Further, the SS/PBCH block index may be associated with a beam. In addition, SS/PBCH transmissions of different beams may be transmitted at different times.

BRIEF DESCRIPTION OF THE DRAWINGS

A more detailed understanding may be had from the following description, given by way of example in conjunction with the accompanying drawings wherein.

DETAILED DESCRIPTION

Figure 1A:
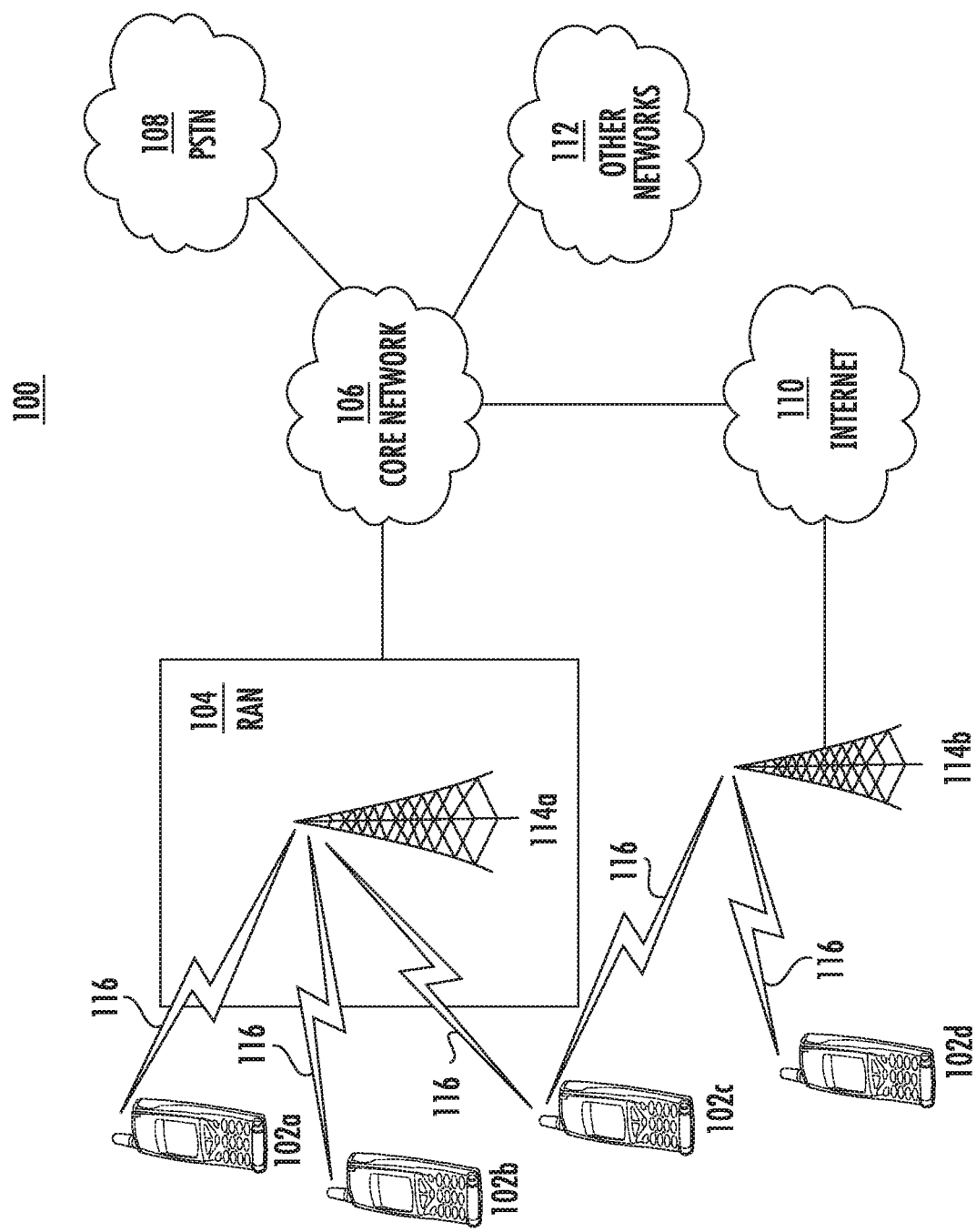
FIG. 1A is a system diagram of an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications system 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
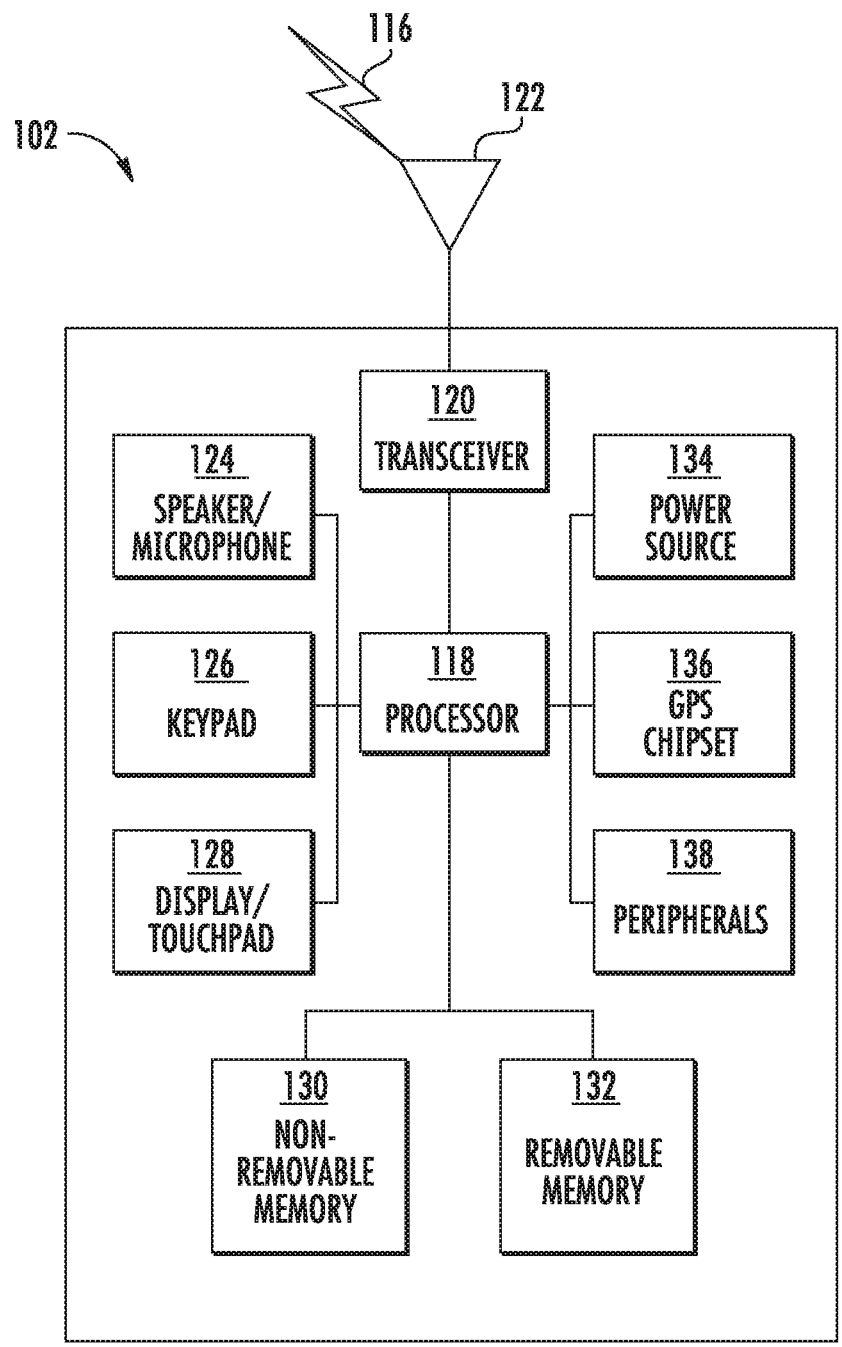
FIG. 1B is a system diagram of an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
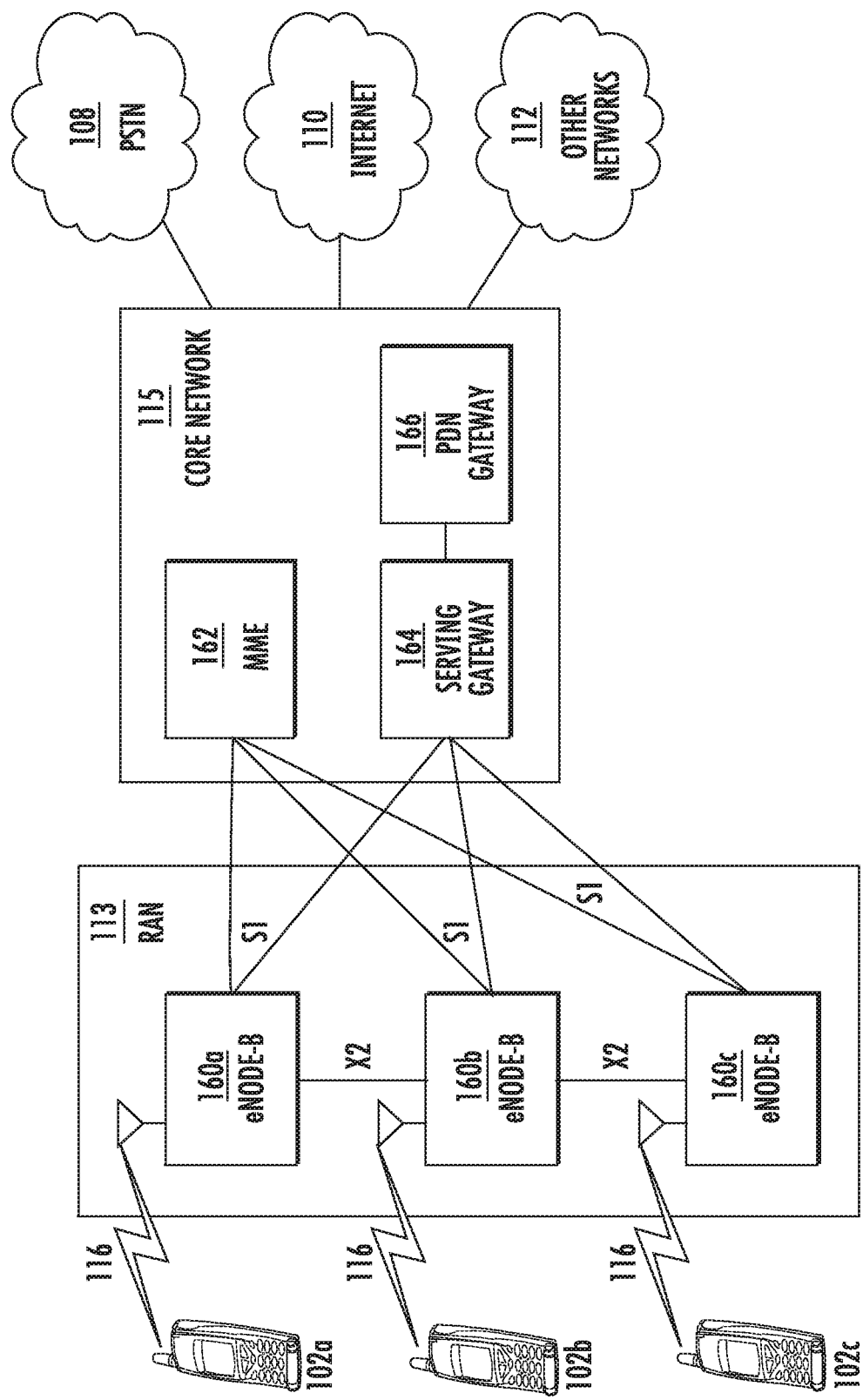
FIG. 1C is a system diagram illustrating an example radio access network (RAN) and an example core network (CN) that may be used within the communications system illustrated in FIG. 1A.

FIG. 1C is a system diagram illustrating the communication system 100 including a RAN 113 and a CN 115. As noted above, the RAN 113 may employ an E-UTRA radio technology to communicate with the WTRUs 102a, 102b, 102c over the air interface 116. The RAN 113 may also be in communication with the CN 115.

The RAN 113 may include eNode-Bs 160a, 160b, 160c, though it will be appreciated that the RAN 113 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 115 shown in FIG. 1C may include a mobility management entity (MME) 162, a serving gateway (SGW) 164, and a packet data network (PDN) gateway (PGW) 166. While the foregoing elements are depicted as part of the CN 115, it will be appreciated that any of these elements may be owned and/or operated by an entity other than the CN operator.

The MME 162 may be connected to each of the eNode-Bs 162a, 162b, 162c in the RAN 113 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 113 and other RANs (not shown) that employ other radio technologies, such as GSM and/or WCDMA.

The SGW 164 may be connected to each of the eNode Bs 160a, 160b, 160c in the RAN 113 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 115 may facilitate communications with other networks. For example, the CN 115 may provide the WTRUs 102a, 102b, 102c with access to circuit-switched networks, such as the PSTN 108, to facilitate communications between the WTRUs 102a, 102b, 102c and traditional land-line communications devices. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
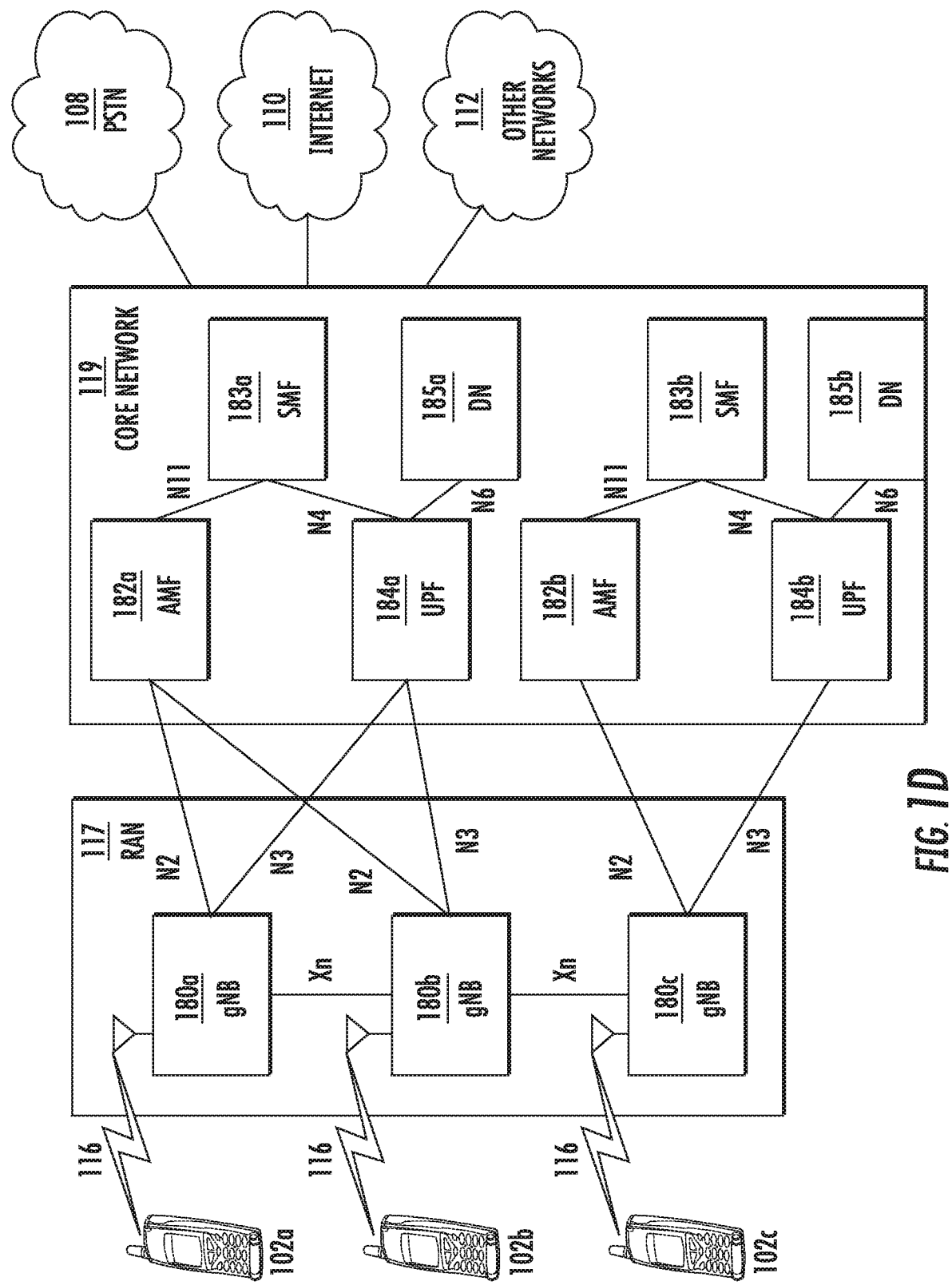
FIG. 1D is a system diagram illustrating a further example RAN and a further example CN that may be used within the communications system illustrated in FIG. 1A.

FIG. 1D is a system diagram illustrating the communication system 100 including a RAN 117 and a CN 119. As noted above, the RAN 117 may employ an NR radio technology to communicate with the WTRUs 102a, 102b, 102c over the air interface 116. The RAN 117 may also be in communication with the CN 119.

The RAN 117 may include gNBs 180a, 180b, 180c, though it will be appreciated that the RAN 117 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 119 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 119, it will be appreciated that any of these elements may be owned and/or operated by an entity other than the CN operator.

The AMF 182a, 182b may be connected to one or more of the gNBs 180a, 180b, 180c in the RAN 117 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 117 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 119 via an N11 interface. The SMF 183a, 183b may also be connected to a UPF 184a, 184b in the CN 119 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 117 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 119 may facilitate communications with other networks. For example, the CN 119 may include, or may communicate with, an IP gateway (e.g., an IP multimedia subsystem (IMS) server) that serves as an interface between the CN 119 and the PSTN 108. In addition, the CN 119 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Based on the general requirements set out by the International Telecommunications Union (ITU) Radiocommunication Sector (ITU-R), the Next Generation Mobile Networks (NGMN) Alliance and the $3^{rd}$ Generation Partnership Project (3GPP), a broad classification of the use cases for emerging 5th Generation (5G) systems can be depicted as follows: Enhanced Mobile Broadband (eMBB), Massive Machine Type Communications (mMTC) and Ultra Reliable and Low latency Communications (URLLC). Different use cases may focus on different requirements such as higher data rate, higher spectrum efficiency, low power and higher energy efficiency, lower latency and higher reliability. A wide range of spectrum bands ranging from 700 megahertz (MHz) to 80 gigahertz (GHz) are being considered for a variety of deployment scenarios.

It is known that as a carrier frequency increases, the severe path loss becomes a crucial limitation to guarantee the sufficient coverage area. Transmission in millimeter wave systems could additionally suffer from non-line-of-sight losses, for example, diffraction loss, penetration loss, oxygen absorption loss, foliage loss, and the like. Utilizing dozens or even hundreds of antenna elements to generate a beam formed signal is an effective way to compensate the severe path loss by providing significant beam forming gain. Beamforming techniques may include digital, analog and hybrid beamforming.

An eNode-B (or eNB) and/or a WTRU may use a random access procedure for at least one of: WTRU initial access, for example, to a cell or eNode-B; reset of UL timing, for example to reset or align WTRU uplink (UL) timing with respect to a certain cell; and reset of timing during handover, for example to reset or align WTRU timing with respect to the handover target cell. The WTRU may transmit a certain physical random access channel (PRACH) preamble sequence at a certain power, PPRACH, which may be based on configured parameters and/or measurements, and the WTRU may transmit the preamble using a certain time-frequency resource or resources. The configured parameters, which may be provided or configured by the eNode-B, may include one or more of: initial preamble power, for example, preambleInitialReceivedTargetPower; a preamble format based offset, for example, deltaPreamble; a random access response (RAR) window, for example, ra-ResponseWindowSize; a power ramping factor, for example, powerRampingStep; and a maximum number of retransmissions, for example, preambleTransMax. The PRACH resources, which may include preambles or sets of preambles and/or time/frequency resources which may be used for preamble transmission, may be provided or configured by the eNode-B. The measurements may include pathloss. One or more the time-frequency resources may be chosen by the WTRU from an allowed set or may be chosen by the eNode-B and signalled to the WTRU.

Following WTRU transmission of a preamble, if the eNode-B detects the preamble, it may respond with an RAR message. If the WTRU may not or does not receive an RAR message for the transmitted preamble, which may for example, correspond to a certain preamble index and/or time/frequency resource, within an allotted time, for example, a ra-ResponseWindowSize, the WTRU may send another preamble at a later time, at a higher power, for example, higher than the previous preamble transmission by powerRampingStep, where the transmission power may be limited by a maximum power, for example a WTRU configured maximum power which may be for the WTRU as a whole, for example PCMAX, or for a certain serving cell of the WTRU, for example PCMAX,c. The WTRU may wait again for receipt of an RAR message from the eNode-B. This sequence of transmitting and waiting may continue until the eNode-B may respond with an RAR message or until the maximum number of random access preamble transmissions, for example, preambleTransMax, may have been reached. The eNode-B may transmit and the WTRU may receive the RAR message in response to a single preamble transmission.

A particular instance of a random access procedure may be contention-based or contention-free. A contention-free procedure may be initiated by a request, for example from an eNode-B, which may, for example, be via physical layer signalling such as a physical downlink control channel (PDCCH) order or by higher layer signalling such as a radio resource control (RRC) reconfiguration message, for example, an RRC connection reconfiguration message, which may include mobility control information and may, for example, indicate or correspond to a handover request. For a contention-free procedure which may be initiated by PDCCH order in subframe n, the PRACH preamble may be transmitted in the first subframe or the first subframe available for PRACH n+k2 where k2 may be >=6. When initiated by an RRC command, there may be other delays which may be specified, for example, there may be minimum and/or maximum required or allowed delays. The WTRU may autonomously initiate a contention-based procedure for reasons which may include for example, initial access, restoration of UL synchronization, or recovering from radio link failure. For certain events, for example, events other than recovery from radio link failure, it may not be defined or specified as to how long after such an event the WTRU may send the PRACH preamble.

For a contention-free random access (RA) procedure, a network-signalled PRACH preamble may be used, for example, by a WTRU. For a contention-based random access procedure, the WTRU may autonomously choose a preamble where the preamble format and/or the one or more time/frequency resources available for preamble transmissions may be based on an indication or index, for example, prach-configIndex, which may be provided or signalled by the eNode-B.

One of the preambles transmitted at the progressively higher transmit powers may be detected by the eNode-B. An RAR message may be sent by the eNode-B in response to that one detected preamble.

A PRACH preamble may be considered a PRACH resource in the examples presented herein. For example, PRACH resources may include a PRACH preamble, time, and/or frequency resources.

The terms preamble resource, RACH resource and PRACH resource may be used interchangeably in the examples provided herein. Further, the terms RA, RACH, and PRACH may be used interchangeably in the examples presented herein. Also, Beam reciprocity and beam correspondence may be interchangeable in the examples presented herein.

As disclosed herein, various examples are presented for use in physical random access in beamforming systems. The following problems are addressed herein. In 5G New Radio (NR), it may be desirable to design a unified RACH for both single and multi-beam operations. Also, in NR it may be desirable to incorporate transmit (TX)/receive (RX) reciprocity properties into random access design. Further, in NR it may be desirable to have efficient solutions to configure PRACH resources. In addition, in a multiple transmission reception point (TRP) scenario, methods for receiving an RAR message or performing random access channel (RACH) reception from a single TRP and/or multiple TRPs are provided herein. Moreover, in NR, it may be desirable to design a simplified RACH as compared to conventional RACH used in LTE.

Modified WTRU procedures may be needed to handle TX/RX beam reciprocity when full, partial or no reciprocity for TX/RX beam reciprocity is present. When TX/RX beams are reciprocal, association may be used to explore reciprocity. A next generation NodeB (gNB) or a TRP may change an order of a beam sweep. In this case, an association or link may be overridden. A TRP may be used as a non-limiting an example of a cell or node that may have a communication path for transmission, for example, in the downlink, and/or reception, for example, in the uplink, with a WTRU.

As used herein, the terms cell, eNode-B, gNB, TRP, node, and entity may be used interchangeably. Further, the terms indication, indicator, and information may be used interchangeably herein. Also, the examples described herein for a TRP may be applied to a WTRU and those described for a WTRU may be applied to a TRP and still be consistent with other examples described herein. The terms same direction and reciprocal direction may be substituted for each other and still be consistent with the examples provided herein. In examples provided herein, the term reciprocal direction may be used to represent a direction that is opposite, for example, plus or minus 180 degrees from, another direction. For a WTRU, a beam direction may be from the perspective of the WTRU. For a TRP, a beam direction may be from the perspective of the TRP. As used in examples provided herein, the terms beam reciprocity and beam correspondence may be used interchangeably. Further, in examples provided herein, the terms beam reciprocity information and beam correspondence information (BCI) may be used interchangeably. Further, the terms DL beam, gNB TX beam and WTRU RX beam may be used interchangeably in examples provided herein. In addition, the terms UL beam, gNB RX beam and WTRU TX beam may be used interchangeably in examples provided herein.

Also, the terms mode and state may be used interchangeably in examples provided herein. Further connected mode may be RRC connected mode in the examples provided herein. Moreover, the terms RA resources and physical RA (PRA) resources may be used interchangeably in examples provided herein. Further, the terms synchronization signal (SS) block and SS/physical broadcast channel (PBCH) block may be used interchangeably in examples provided herein. In addition, the terms PBCH and NR-PBCH may be used interchangeably in examples provided herein, and the terms SS and NR-SS may be used interchangeably in examples provided herein.

When TX/RX beams are partially reciprocal, a partial association or a partial link may be used to explore partial reciprocity. Some gNB TX beams may not be reciprocal to the gNB RX beams. For example, TX beamwidth may not be equal to RX beamwidth. This may be due to different transmit and receive antenna structures or different numbers of antennas. Therefore the following two cases may need to be considered for WTRU procedures. In one case, the gNB TX beamwidth may be greater than the gNB RX beamwidth. In another case, the gNB TX beamwidth may be less than the gNB RX beamwidth.

In another scenario, the gNB TX beam may not be completely aligned with the RX beam. For example, the TX and the RX beams may partially overlap even if they have the same beamwidth.

In a case when TX/RX beams are not reciprocal, dynamic association may be used. Modified methods for indication of gNB RX beams from gNB TX beams are needed. A dynamic indication or a semi-static indication may be used.

An example method may include transmitting, by a gNB, an indication of a gNB TX/RX reciprocity. The method may further comprise determining, by a gNB, a mapping of a gNB TX beam to a gNB RX beam. A gNB may determine one or more WTRU transmit beams and transmit an indication, to a WTRU, of a best DL beam for a RAR. A mapping of TX and RX beams may be further refined. On a condition a gNB TX/RX reciprocity is present, a full association between a gNB and a WTRU may be established.

Also, an example method may include performing TX beam sweeping and receiving, from a TRP, information corresponding to a selected WTRU TX beam, wherein the selected WTRU beam information is based on a determined WTRU TX beam. The WTRU may be further configured to perform RX beam sweeping and determine, one or more RX beams based on a measurement criteria. The WTRU may derive one or more TX beams using the determined one or more RX beams and the WTRU may determine beam reciprocity based on a set of rules.

An example system may include a receiver configured to receive, from a TRP, a request for the WTRU to determine beam correspondence or reciprocity information. Based on the received request, circuitry may be configured to determine a beam correspondence or reciprocity. The system further includes a transmitter configured to transmit, to the TRP, a WTRU capability indication comprising both WTRU capability information and information corresponding to the determined beam correspondence or reciprocity. In this way, a single message may be utilized for both capability indication and beam correspondence or reciprocity.

Figure 2:
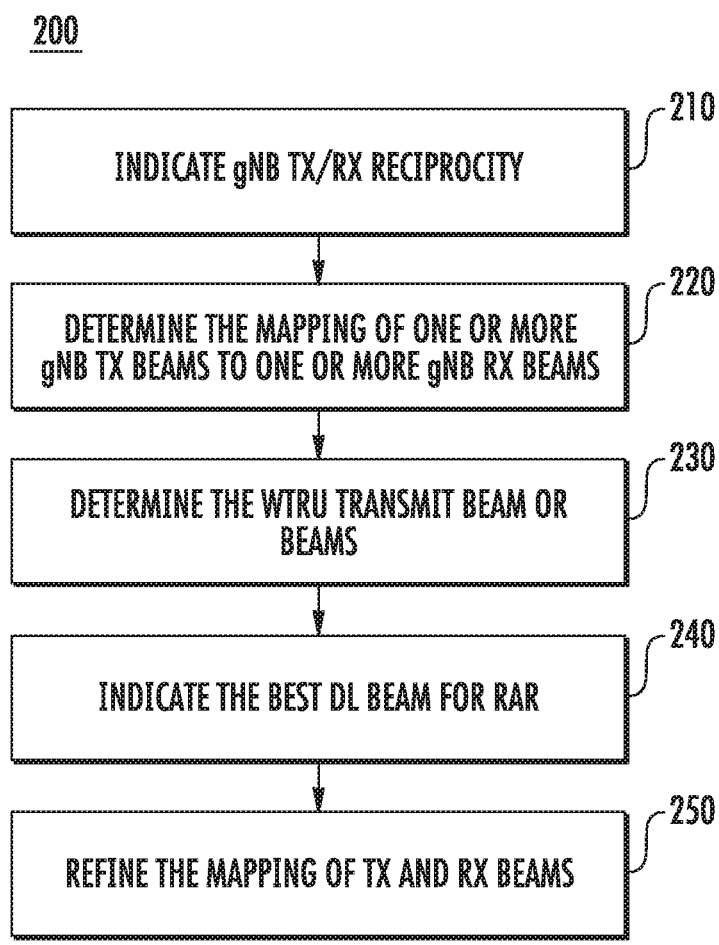
FIG. 2 is a flowchart diagram which illustrates an example of a beamformed random access method.

FIG. 2 is a flowchart diagram which illustrates an example of a beamformed random access method. As shown in flowchart diagram 200, the following example procedures may be perform. A gNB may transmit and a WTRU may receive an indication of gNB TX beam/RX beam reciprocity 210. Further, a WTRU may map a gNB TX beam to a gNB RX beam 220. In addition, the WTRU may determine the WTRU transmit beam or beams 230. Also, the WTRU may transmit and gNB may receive an indication of the best DL beam for RAR 240. The WTRU may then refine mappings of TX and RX beams 250.

Example methods of handling gNB TX beam/RX beam reciprocity are described herein. If gNB TX/RX reciprocity is present, full association between one or more TX beams and one or more Rx beams of gNB as well as association between WTRU and a gNB may be established. A one-to-one mapping between a SS/PBCH block including PBCH and PRACH time-beam resources may be used. One or more PRACH time resources may be used to indicate the detected SS/PBCH blocks. Association may indicate the best preamble RX beam at the gNB from a detected best SS/PBCH block or PBCH TX beam. That is, a TX beam may be equal to an RX beam.

A PBCH may signal the TX/RX beam reciprocity mode to the WTRU. When WTRU receives this message, WTRU may need to perform preamble transmission for one particular gNB RX beam or for each of the gNB RX beams to cooperate with a gNB RX beam sweep. A TX/RX beam reciprocity mode may be used. For example, TX/RX beam reciprocity mode="1" may indicate that TX/RX beam reciprocity is present. In a further example, TX/RX beam reciprocity mode="0" may indicate that TX/RX beam reciprocity is absent.

In an example TX/RX beam reciprocity mode, such as in TX/RX beam reciprocity mode="1", a gNB may change the beam sweep order and override the beam order for beam sweep at any time due to the flexible operation of the system and the network. A gNB may override the association and TX/RX reciprocity. In this case there may be no indication about the best preamble RX beam from the detected best SS/PBCH block including a PBCH TX beam. In an example, the timing of the RX beam and the timing of the TX beam are synchronous but the beam order may not be synchronous even though TX/RX beam reciprocity may be present. Therefore a full RX beam sweep may be necessary regardless of the existence of TX/RX beam reciprocity.

In a further example, the gNB may send an indication to the WTRU including information regarding an association between SS/PBCH blocks and one or more PRACH preamble sequences and/or one or more resources. For example, the gNB may signal WTRU to transmit the preamble in particular time resources for the gNB RX beam. By doing so, the WTRU may not need to perform a preamble transmission for all gNB RX beams during the gNB RX beam sweep period. A PBCH or broadcast signal/channel carrying remaining minimum system information or other system information may be used to indicate such information about the best gNB RX beam to the WTRU. The gNB may send such an indication in a further example TX/RX beam reciprocity mode, such as TX/RX beam reciprocity mode="0" or similar mode. The mode may be used in order to have the WTRU save power.

An example method is proposed herein to override the association and the TX/RX beam reciprocity. In an example, a solution is to indicate the override Mode. For example, a PBCH may signal the override mode to a WTRU. When the WTRU receives this message, the WTRU may need to perform preamble transmission for each gNB RX beam or a subset of gNB RX beams to cooperate with a gNB RX beam sweep.

In an example, an override mode="0" may indicate no information about a gNB RX beam should be assumed even though TX/RX beam reciprocity Mode="1". An override mode="1" may indicate information about a gNB RX beam may be assumed if TX/RX beam reciprocity mode="1". In another example, method, an association mode="0" may indicate no information about the gNB RX beam and an assumption should be made from a gNB TX beam. Further, an association mode="1" may indicate information about the gNB RX beam may be assumed from the gNB TX beam.

A gNB may have control of an override and have knowledge about TX/RX beam reciprocity. Therefore, a gNB may signal an association mode to a WTRU. In an example, if association mode="0", no information about a gNB RX beam may be assumed even though TX/RX beams have reciprocity. In another example, when association mode="1", information about a gNB RX beam may be assumed, even though TX/RX Beams have no reciprocity.

Example methods of handling partial gNB TX/RX beam reciprocity or no gNB TX/RX beam reciprocity are discussed herein. If TX/RX reciprocity is partially present, partial association such as one-to-many, many-to-one, many-to-many may be used. Association may still indicate the best preamble RX beam at the gNB from the detected best PBCH TX beam as long as association is time synchronous. In this case, the gNB may need to arrange the RX beam to match the TX beam as much as possible.

TX and RX beamwidths may be different due to no gNB TX/RX beam reciprocity or partial TX/RX beam reciprocity. If an RX beam is wider and fully covers the TX beam, such a wide RX beam may be sufficient to receive a preamble transmission. If the RX beam is narrower and covers only part of a TX beam, a better resolution of the RX beam may be needed. In an example, more symbols may be needed for a gNB RX beam sweep. For example, if an RX beam is only half of a TX beam in beamwidth, the gNB may need to double the beam sweep resolution for gNB receiver. Therefore a non-uniform beam sweep may be proposed for preamble transmission and/or reception. A PBCH may use M-beams for a TX beam sweep while preamble reception at the gNB may use L-beams for a beam sweep. When L>M, RX beamwidth may be smaller than TX beamwidth. When L<M, RX beamwidth may be larger than TX beamwidth.

In examples described herein, TX beams and RX beams may be partially overlapping. In an example, even when a TX beamwidth and an RX beamwidth are the same but the TX beam and the RX beam are not fully aligned with each other, then two or more RX beams may be needed for beam sweep in order to cover the best TX beam, due to the beam overlap between the TX and RX beams. A different number of beams for TX and RX beam sweep may be needed as in the case of a TX beamwidth being different from an RX beamwidth. However the gNB may need to monitor left and right beams corresponding to a detected DL beam for a given WTRU. In an example, beam receive diversity with signal combining may be used.

Association may be used to explore TX/RX reciprocity. When reciprocity is not present, full association may become less important. In an example, partial association may be used. That is, one DL TX beam may be mapped to two or multiple UL RX beams if DL TX beam is wider. Or multiple DL TX beams may be mapped to one UL RX beams if DL TX beam is narrower. There could be a case where multiple DL TX beams may be mapped to multiple UL RX beams, such as in a case when the TX beamwidth is not an integer multiple of RX beamwidth or vice-versa.

If TX/RX beam reciprocity is not present, dynamic signaling or semi-static signaling may be used. In an example, a time order of the beams may be present but at least one of the following may also hold true: the TX beam resolution may not be the same as the RX beam resolution, the TX beam and the RX beam may not be aligned or and the TX beam and the RX beam may not be synchronous. In a further example, a beam order may not be present, and a TX beamwidth may not be equal to an RX beamwidth. An RX beam sweep may be necessary. However, a solution using PBCH to indicate the desired RX beam to WTRU may be required. An example solution is illustrated in FIG. 3.

Figure 3:
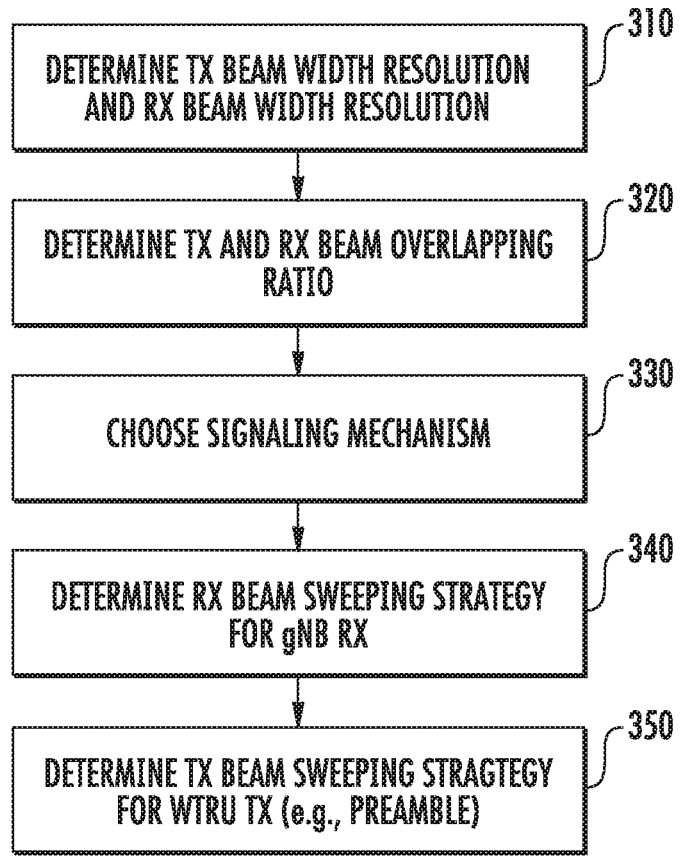
FIG. 3 is a flowchart diagram which illustrates an example method and procedure for partial transmit (TX) beam/receive (RX) beam reciprocity.

FIG. 3 is a flowchart diagram which illustrates an example method and procedure for partial TX beam/RX beam reciprocity. In an example shown in flowchart diagram 300, a resolution for TX beamwidth and a resolution for RX beamwidth may be determined 310. Also, a TX beam and RX beam overlapping ratio may be determined 320. Further, a corresponding signaling mechanism may be chosen for indicating the beamwidth resolution as well as beam overlapping ratio 330. For example, the gNB may signal association information between one or more SS/PBCH blocks and one or more PRACH preamble sequences and/or one or more time/frequency resources to a WTRU. For example, the gNB may signal beam correspondence information to a WTRU. In addition, a gNB may decide and choose an RX beam sweeping strategy for a gNB receiver 340. As well, a TX beam sweeping strategy for a WTRU transmitter, may be decided and chosen by the gNB 350. In an example, the gNB may choose that the WTRU should use a preamble transmission as a beam sweeping strategy.

A WTRU may receive a synchronization (SYNC) signal, reference signal, and/or other signal from a TRP, in order to, for example, synchronize in time and/or frequency with the TRP. A WTRU may receive one or more signals or information from a TRP in a direction that may be, for example, may be determined by the WTRU to be, an acceptable direction or a best direction. An acceptable direction may be a direction from which the WTRU may be able to receive and/or decode one or more signals from the TRP, such as a broadcast signal that may include a broadcast channel (BCH), for example, a PBCH. A best direction may be a direction that the WTRU may determine to provide the highest signal strength (or other best measure or measurement), for example, from among a set of acceptable directions.

The determined direction may correspond to a TRP transmit (TRP-TX) beam. Further, the determined direction may correspond to a WTRU receive (WTRU-RX) beam. Information regarding the TRP-TX beam may be provided explicitly, for example, via a PBCH or system information that may be broadcast, or implicitly for example, by the use of different sync signals or reference signals for different beams or by the use of different masking or cover codes on the sync signals or reference signals to distinguish different beams.

A WTRU may determine a receive direction based on the direction granularity of its WTRU-RX beams which may or may not match the granularity of the TRP-TX beams. In an example, the receive direction may be an angle of arrival.

A WTRU may choose or determine a set of transmit beams (WTRU-TX beams) or transmit directions for a transmission, for example, an initial transmission, to a TRP based on a determined acceptable beam or direction or a determined best beam or direction. Direction and beam may be substituted for each other in the embodiments and examples described herein.

In an example, reciprocity information may be provided, for example, by a TRP, and/or used for example, by a WTRU. A WTRU may determine a set of beams or directions for transmission to a TRP based on at least reciprocity, for example, information regarding reciprocity, of the TRP transmit and receive beams, directions, and/or communication paths.

A WTRU may receive and/or use a configuration or information regarding reciprocity that may be used or assumed for a cell, an eNode-B, a gNB, a TRP, a node, for example, a network node, or another entity. In an example, another entity may be a network entity with which the WTRU may communicate.

The reciprocity information, for example, for a TRP, may be used to indicate the relation between a transmit communication path and a receive communication path, for example, of the TRP. For example, the reciprocity information may include an indication of a relationship between a TRP-TX beam characteristic and a TRP-RX beam characteristic.

A beam characteristic may be a beam width, a beam direction, and/or a number of beams. For example, reciprocity information for a TRP may indicate at least one of the following. The reciprocity information may indicate whether a TRP-RX beam width is wider, or narrower, than a transmit beam width. Also, the reciprocity information may indicate whether the number of TRP-TX beams and TRP-RX beams is the same.

Further, the reciprocity information may indicate whether a TRP-RX beam direction is the same as a TRP-TX beam direction. In an additional example, the reciprocity information may indicate whether each TRP-RX beam direction is the same as a respective TRP-TX beam direction. In an example, the reciprocity information may indicate whether the beam directions are the same regardless of whether the number of beams is the same and/or the beam widths are the same.

Also, the reciprocity information may indicate whether the TRP has a TRP-RX beam in the same direction as a transmit beam. Moreover, in an example, the reciprocity information may indicate whether each TRP-RX beam of the TRP has the same direction as a respective transmit beam.

A transmit beam, for example, for which reciprocity information may be indicated, may be a beam that may provide at least one of a synchronization signal, a reference signal, a broadcast channel or signal, for example, a PBCH, and/or system information, for example, a system information block (SIB). Further, a transmit beam, for example, for which reciprocity information may be indicated, may refer to a beam that may provide at least one of a synchronization signal, a reference signal, a broadcast channel or signal, for example, a PBCH, and/or system information, for example, a SIB.

A reciprocity indication may provide a value, a ratio, and/or an index to a table of values that may convey the relevant information. One or more reciprocity indications may be provided via broadcast or system information. One or more reciprocity indications may be provided by a PBCH. A WTRU may receive and/or determine reciprocity information and may use the information, for example, at least one reciprocity indicator, to determine at least one beam characteristic for transmission to a TRP.

A transmission may be of a signal, for example, a reference signal, or channel. A transmission may be of a preamble, data or a data channel, control information or a control channel. A transmission may be for an initial access which may be a random access, a grant-less access, or a granted access. In an example, random access may include that a preamble for transmission may be chosen randomly. In a further example, a granted access may include a scheduled access.

A WTRU may determine a beam, according to an example described herein, that may be an acceptable beam or a best beam. In an example, an acceptable beam may include an acceptable direction for the beam and a best beam may include the best direction for the beam. In the examples described herein, the term determined DL beam is used as a non-limiting example of a determined best beam or acceptable beam.

A WTRU may determine a set of M transmit beams (WTRU-TX beams) or transmit directions for a transmission, for example, an initial transmission, to a TRP based on at least reciprocity information or a reciprocity indication it may receive or determine regarding the TRP. The WTRU may transmit to the TRP on the M transmit beams. Transmission on multiple beams may be in series or in parallel, for example, based on the capabilities of the WTRU and/or the TRP.

For example, a WTRU may determine the number of beams, M, in the set of WTRU-TX beams based on at least reciprocity information or a reciprocity indication the WTRU may determine or receive. The WTRU may determine which WTRU-TX beams to include in the set, for example, on which beams or in which directions to transmit, based on at least reciprocity information or a reciprocity indication the WTRU may determine or receive.

The WTRU may determine the set of WTRU-TX beams, for example, based on reciprocity information, to include at least one of the following: a first WTRU-TX beam, for example, one or only one WTRU-TX beam, that may be in the same direction or a nearest direction as the determined DL beam; one or more, for example, N, beams that may be adjacent to, for example, left and/or right of, the first WTRU-TX beam.

In an example, N may be 0. The value of M and/or N may be dependent on whether TRP-TX beams and TRP-RX beams may have the same direction, for example, whether TRP-RX beams may be centered on TRP-TX beams.

For example, if TRP-RX beams may be centered on TRP-TX beams, N may be a first number, such as 0 or a small number, and/or M may be a first number such as 1 or a small number. If TRP-RX beams may not be centered on TRP-TX beams, M and/or N may be a second number that may be larger than the first corresponding number.

The value of M and/or N may be dependent on the beam width of at least one of the WTRU-TX beams, the WTRU-RX beams, the TRP-TX beams, and/or the TRP-RX beams. N may be an even number. N may be evenly split to the left and right of the first beam.

WTRU-TX beam directions may not match exactly to WTRU-RX beam directions or to TRP-TX beams. A WTRU-TX beam with a nearest direction to a determined DL beam may be used as an UL beam.

A beam type may be at least one of a TRP-TX beam, a TRP-RX beam, a WTRU-TX beam, and/or a WTRU-RX beam. A WTRU may determine at least one of M, N, and/or the set of WTRU-TX beams based on at least one of: the number of beams and/or beam widths of at least one beam type; or the relationship of the number of beams and/or beam widths between at least two beam types.

For example, M may be determined to be a first number when the beam widths of the TRP-TX beams and the TRP-RX beams may be the same. M may be determined to be a second number when the beam widths of the TRP-TX beams and the TRP-RX beams may not be the same. The second number may be smaller than the first number, for example when the TRP-RX beams may be wider than the TRP-TX beams.

The WTRU may determine a beam width for a WTRU-TX beam based on at least reciprocity information the WTRU may receive.

For example, a WTRU may provide beam characteristic information and/or reciprocity information, for example, for WTRU-TX and WTRU-RX beams, to a TRP, for example, a TRP with which it may communicate. An example is shown in FIG. 4.

Figure 4:
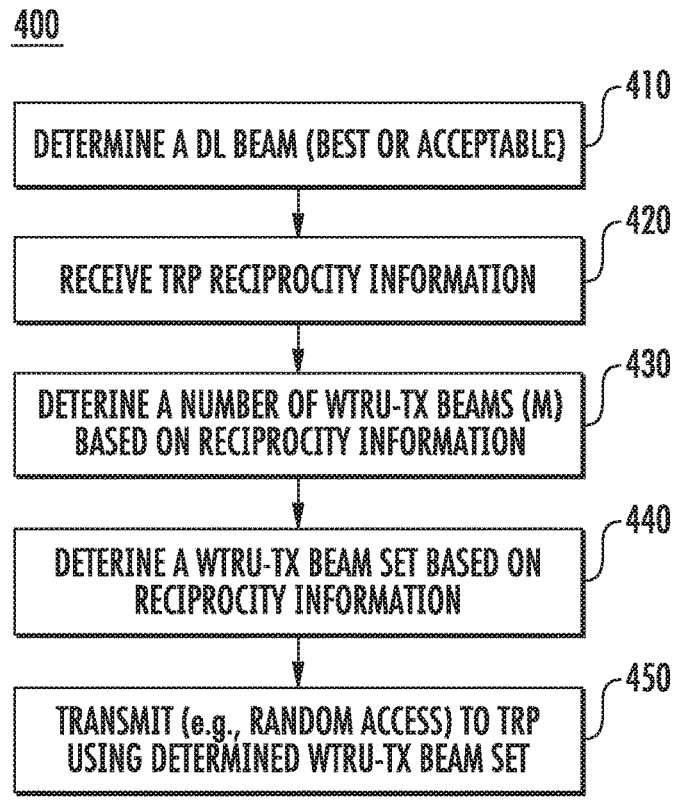
FIG. 4 is a flowchart diagram which illustrates an example use of reciprocity to determine a WTRU-TX beam set.

FIG. 4 is a flowchart diagram which illustrates an example use of reciprocity to determine a WTRU-TX beam set. In an example shown in flowchart diagram 400, a WTRU may determine a DL beam to use 410. For example, the WTRU may determine to use a best DL beam. In a further example, the WTRU may determine to use an acceptable DL beam. The WTRU determination may be based on beam strength. In a further example, the DL beam may be used for synchronization between the WTRU and the TRP. In another example, the DL beam may be used by the WTRU for PBCH reception. Further, the WTRU may determine TRP beam reciprocity information. For example, the WTRU may determine TRP beam reciprocity information based on the determined DL beam. In an example, the WTRU may receive TRP beam reciprocity information 420. As a result, the WTRU may determine TRP beam reciprocity information based on the received TRP beam reciprocity information. In another example, the WTRU may be pre-configured with TRP beam reciprocity information. In a further example, the WTRU may determine TRP beam reciprocity information based on a PBCH cyclic redundancy check (CRC) mask, one or more PBCH resources, a PBCH payload, a SIB, or the like. In addition, the WTRU may determine TRP TX/RX BCI. For example, the WTRU may determine the TRP BCI based on the determined DL beam. In an example, the WTRU may receive TRP TX/RX BCI. As a result, the WTRU may determine TRP TX/RX BCI based on the received TRP TX/RX BCI. In another example, the WTRU may be pre-configured with TRP TX/RX BCI. In a further example, the WTRU may determine TRP TX/RX BCI based on a PBCH cyclic redundancy check (CRC) mask, one or more PBCH resources, a PBCH payload, a SIB, or the like.

Also, the WTRU may determine a number of WTRU-TX beams, which may be represented by M, based on the beam reciprocity information 430. In another example, the WTRU may determine a number of WTRU-TX beams based on the TRP TX/RX BCI. In addition, the WTRU may determine the WTRU-TX beam set based on the beam reciprocity information 440. In a further example, the WTRU may determine the WTRU-TX beam set based on the TRP TX/RX BCI. In still a further example, the WTRU determining the set of WTRU-TX beams may be further based on the determined number of WTRU-TX beams. In an example, determining the WTRU-TX beam set includes determining one or more WTRU-TX beam directions.

Moreover, the WTRU may transmit to the TRP using the determined WTRU-TX beam set 450. In an example, the WTRU may transmit to the TRP using a random access procedure. In a further example, the WTRU may transmit data using the determined set of WTRU TX beams.

In a further example, the WTRU may determine a timing for transmission using the set of WTRU TX beams based on at least the TRP TX/RX BCI. In another example, the TRP TX/RX BCI may include at least one of an indication of a correspondence type, a TX/RX beam width relationship or a TX/RX beam direction relationship. In yet another example, the WTRU may determine and transmit a WTRU TX/RX BCI.

A PBCH may indicate TX/RX reciprocity for optimizing preamble reception. Several methods may be used for the indication. For example, a CRC mask may be used or employed in a such a method. Another example method may use an orthogonal cover code. A further example method may use a PBCH detection position (such as time or frequency). An additional example method may employ 1 or 2 bits explicitly in a PBCH payload.

Figure 5:
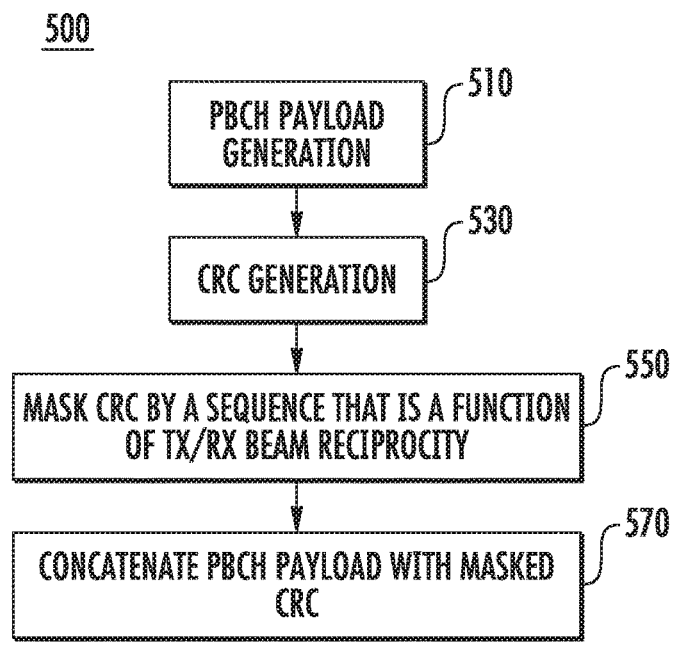
FIG. 5 is a flowchart diagram which illustrates an example method for the indication of TX/RX beam reciprocity.

FIG. 5 is a flowchart diagram which illustrates an example method for the indication of TX/RX beam reciprocity. As shown in an example in flowchart diagram 500, TX/RX beam reciprocity may be indicated using a CRC mask via a PBCH. Depending on the number of TX/RX beam reciprocity modes, a corresponding number of masks may be used. For example, a PBCH payload may be first generated 510. Also, a CRC may be generated 530. The generated CRC may be masked with a sequence that is a function of TX/RX reciprocity 550. PBCH payload may then be concatenated with the masked CRC 570.

In order to indicate three types of TX/RX beam reciprocity, three configurations may be defined. For example, a configuration 1 may indicate full TX/RX beam reciprocity, a configuration 2 may indicate partial TX/RX beam reciprocity, and a configuration 3 may indicate no TX/RX beam reciprocity. The numbering of the configurations may be reordered and still be consistent with the examples provided herein. Further, different numbers of configurations may be used and still be consistent with the examples provided herein.

In an example, three sequences may be used for the CRC mask for the method depicted in FIG. 5. In other examples, a different number of sequences may be used for the CRC mask and still be consistent with the examples provided herein.

In an example, partial TX/RX reciprocity may be due to interference and may occur in a dynamic manner. Therefore, using a semi-static signaling method may not be an optimal procedure to provide a TX/RX beam reciprocity indication. Instead, a combination of semi-static and dynamic signaling method may be optimal. For example, in order to indicate two types of TX/RX beam reciprocity, two configuration types may be defined. In an example, configuration 1 may indicate full TX/RX reciprocity and configuration 2 may indicate no TX/RX reciprocity. Therefore two sequences may be used for the CRC mask for the method depicted in FIG. 5.

Figure 6:
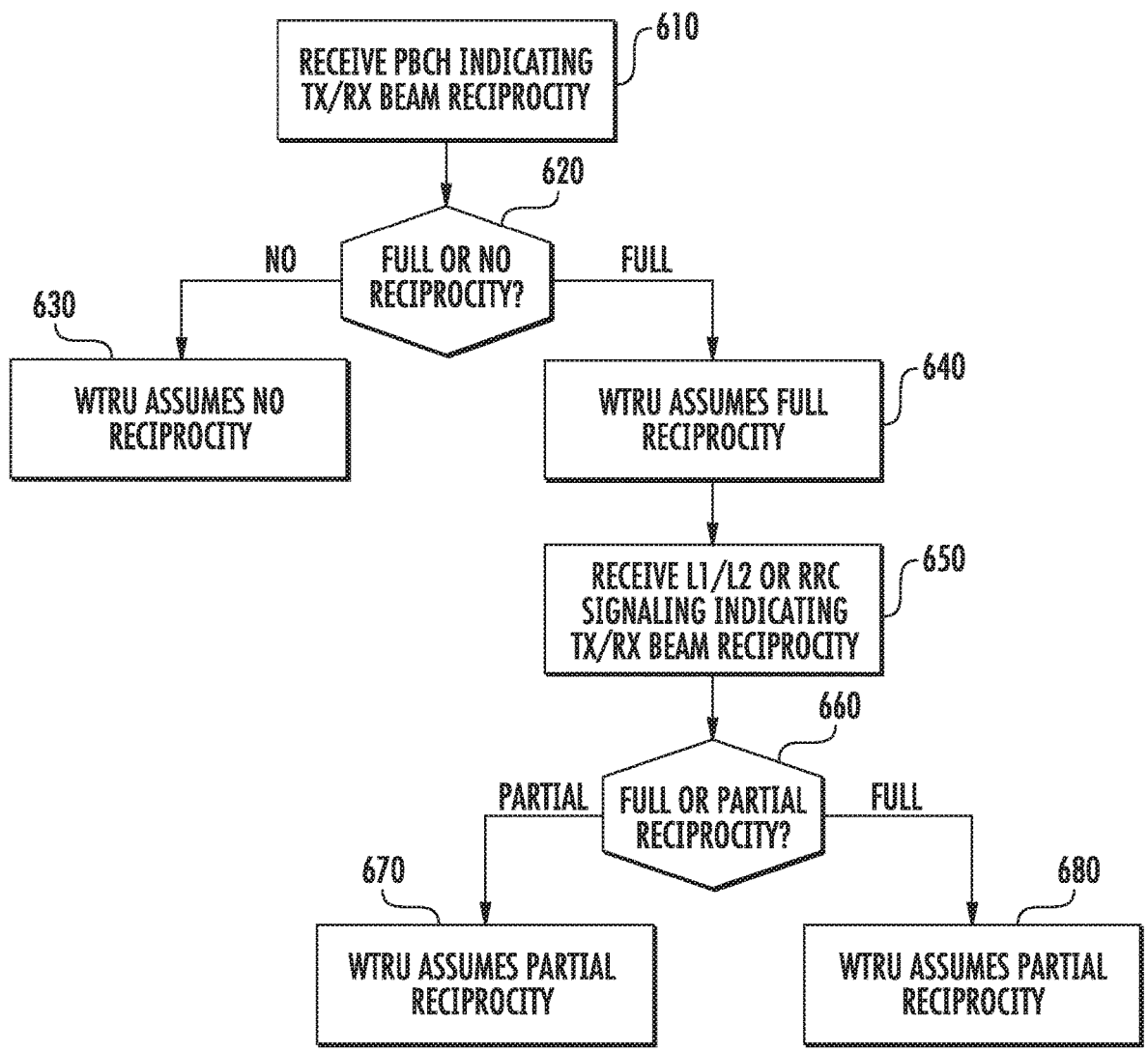
FIG. 6 is a flowchart diagram which illustrates an example method and procedure to determine TX/RX beam reciprocity.

FIG. 6 is a flowchart diagram which illustrates an example method and procedure to determine TX/RX beam reciprocity. A TRP or gNB may still need to indicate partial TX/RX reciprocity using dynamic signaling such as Layer 1 (L1)/Layer 2 (L2) signaling. An example procedure as shown in flowchart diagram 600 may be performed to dynamically signal partial TX/RX reciprocity. For example, a WTRU may receive a PBCH indicating TX/RX beam reciprocity 610. The WTRU may determine if the PBCH indicates either full TX/RX beam reciprocity or no TX/RX beam reciprocity 620. If the PBCH indicates no TX/RX beam reciprocity, the WTRU may assume no gNB TX/RX beam reciprocity 630. If the PBCH indicates TX/RX beam reciprocity, the WTRU may assume full gNB TX/RX beam reciprocity 640. When the WTRU receives a PBCH indicating full reciprocity, the WTRU may temporarily assume full gNB TX/RX beam reciprocity 640 until the WTRU receives a second tier indication indicating whether the gNB TX/RX beam reciprocity is truly full gNB TX/RX beam reciprocity or partial gNB TX/RX beam reciprocity 650. In examples, such a second tier indication may be sent using L1/L2 signaling or RRC signaling. The WTRU may determine if the second tier indication is for full reciprocity or partial reciprocity 660. For example, if the second tier indication is for partial reciprocity, the WTRU may assume partial reciprocity 670. Further, if the second tier indication is for full reciprocity, the WTRU may assume full reciprocity 680.

In order to indicate three types of association modes, three modes may be defined. For example, a mode 1 may indicate full association, a mode 2 may indicate partial association, and a mode 3 may indicate no association. The numbering of the modes may be reordered and still be consistent with the examples provided herein. Further, different numbers of modes may be used and still be consistent with the examples provided herein.

Three sequences may be used for CRC mask for association mode in the following example method. Association mode may be indicated using CRC mask as well, in an example.

Figure 7:
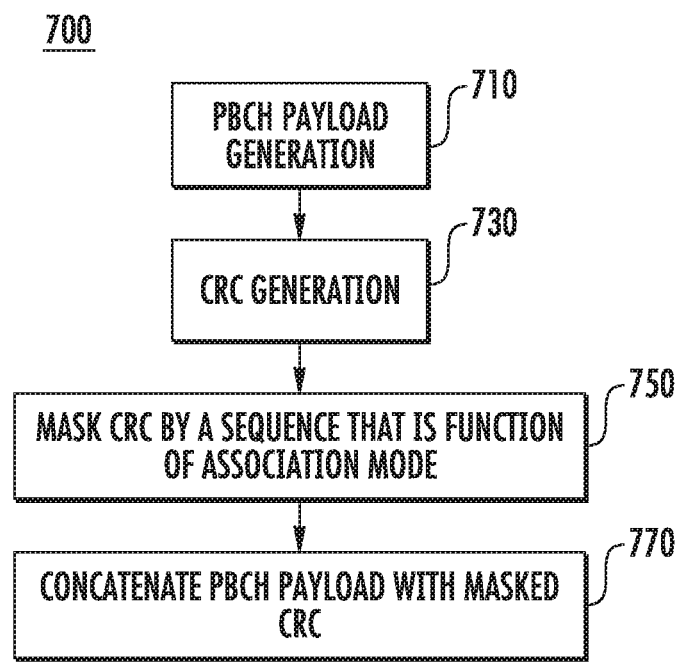
FIG. 7 is a flowchart diagram which illustrates another example method for the indication of TX/RX beam reciprocity.

FIG. 7 is a flowchart diagram which illustrates another example method for the indication of TX/RX beam reciprocity. In an example shown in flowchart diagram 700, a gNB may generate a PBCH payload 710. Further, the gNB may generate a CRC 730. The generated CRC may be masked with a sequence that is a function of the association mode. Depending on the number of association modes, a corresponding number of one or more masks may be used. The generated CRC may be masked by the gNB with a sequence that is a function of the association mode 750. The PBCH payload and masked CRC may then be concatenated by the gNB 770.

In a further example, the PBCH CRC may be scrambled or XORed with N bit mask which may jointly indicate number of antennas or antenna ports, antenna configurations antenna and/or TX/RX beam reciprocity. In an example, N may be 16. In other examples, N may be 8, 24 or 32. If a TRP or gNB has TX/RX reciprocity with M transmit antennas, then the PBCH CRC may be scrambled with the mask corresponding to TX/RX reciprocity with the M antennas and so on. A PBCH may also be used to indicate one or multiple gNB RX beams to WTRU.

The following example method use a PBCH for the indication of a preamble RX beam. In an example for one RX beam indication only, an implicit indication may use a PBCH masking, SS block time index, PBCH demodulation reference signal (DMRS) sequence index or the like. Further, each mask, SS block time index, PBCH DMRS sequence index or the like may correspond to the best gNB RX beam. The best gNB RX beam may be mapped to a preamble index, and the mask, SS block time index, and/or PBCH DMRS sequence index may be associated with a preamble index. The preamble index may include one or more of a sequence index, time index, frequency index, resource index or the like. In another example, for one RX beam indication only, an explicit indication may use payload bits, and a few bits may be used to indicate the best gNB RX beam. For example, the bits used for explicit indication may be carried in a RACH message 2 or an RAR message.

In an example for a multiple RX beam indication, an implicit indication may use PBCH masking, SS block time index, PBCH DMRS sequence index or the like, wherein each mask, SS block time index, PBCH DMRS sequence index or the like may correspond to a subset of beams, for example, the best K gNB RX beam or beams. The best K gNB RX beam(s) may be mapped to a set of one or more preamble indexes and one or more masks, SS block time indexes or PBCH DMRS sequence indexes may be associated with a set of preamble indexes. The preamble index may include one or more of a sequence index, time index, frequency index, resource index or the like. In an example, the best K gNB RX beam(s) may be mapped to a set of K preamble index(es) and K mask(s). In another example for a multiple RX beam indication, an explicit indication may use payload bits, and a few bits may be used to indicate a subset of beams, for example, the best K gNB RX beam.

In examples provided herein, a gNB TX beam may be mapped to a gNB RX beam. In an example, the gNB TX beam may be used to transmit an SS block which may include a time index, which may be an SS block time index. Further a gNB TX beam ID may be an SS block time index. Also, the gNB RX beam may be used to receive a preamble which may use one or more preamble sequences and/or one or more preamble resources. Further, the preamble resources may be allocated according to a preamble resource index, which may include a time resource index and/or a frequency resource index. Also, the preamble sequence may be determined based on a preamble sequence index, In an example, a gNB TX beam may be mapped to a time index x, for example, SS block time index x, and a gNB RX beam may be mapped to a time index y, for example, PRACH resource time index y. In an example, y may equal x plus c and c may be a time offset, a frequency offset, another type of offset and the like. In further examples, c may be equal to 0 and a time offset may or may not be used. This may imply that the gNB TX beam is associated with the gNB RX beam or a DL SS block time index may be associated with an UL preamble time resource index. When a WTRU detects the best gNB TX beam at time x, it may automatically know the best gNB RX beam at time y or vice versa.

When a gNB detects the preamble at time resource index y that is transmitted by a WTRU, it may implicitly know the best SS/PBCH block time index x that the WTRU detects. When the WTRU determines to report such a time index say SS/PBCH block time index x to gNB, WTRU may send preamble in time resource index y where time index x and y are associated with each other. In an example, each gNB TX beam may be mapped to an SS block and each gNB RX beam may be mapped to a preamble time resource. In order to ensure that a preamble may be received by gNB's best RX beam, a WTRU should send the preamble at time resource y. When gNB TX/RX reciprocity is not present, the PRACH resource may be defined by a time-frequency index and the SS block may be associated with one or more UL preamble time/frequency resources and/or sequences. For example, the SS block time index may be associated with one or more UL preamble time/frequency resource and/or sequence index. This is because a WTRU can select a preamble and transmit the selected preamble on PRACH time-frequency resources to identify the SS block and feedback the SS block time index. For example, a WTRU may select a preamble, such as preamble index n, and transmit the selected preamble on the PRACH frequency resources to identify the n-th SS block and feedback the SS block time index. In another example, a WTRU may select a preamble and transmit the selected preamble on the PRACH frequency resource, such as resource index n, to identify the n-th SS block and feedback the SS block time index. In a further example, a WTRU may select a preamble, such as preamble index n, and transmit the selected preamble on the PRACH frequency resource, such as frequency resource index m, to identify the n-th SS block and feedback the SS block time index. In this case, the n-th SS block may be associated with preamble index n and frequency resource index m.

In an example, a WTRU may select a preamble, such as preamble index n, and transmit the selected preamble on the PRACH frequency resource, such as frequency resource index m, at a time resource index j to identify the n-th SS block and feedback the SS block time index. In this case, the n-th SS block may be associated with the preamble index n, frequency resource index m and time resource index j.

In another example, an SS block may be associated with multiple preamble, frequency and/or time indexes. In this case a WTRU may select a preamble in a preamble set, such as preamble set index n, and transmit the selected preamble on the PRACH frequency resource in a frequency set, such as frequency resource set index m, at time resource set j to identify the n-th SS block and feedback the SS block time index. In this case, the n-th SS block may be associated with the preamble set index n, frequency resource set index m and/or time resource set index j.

Multiple SS blocks may also be associated with a preamble, frequency and/or time index. A WTRU may select a preamble, such as preamble index n, and transmit the selected preamble on the PRACH frequency resource, such as frequency resource index m, at a time resource index j to identify the n-th set of SS blocks and feedback the SS block time index or SS block set time index. In this case, the n-th set of SS blocks may be associated with the preamble index n, frequency resource index m and/or time resource index j.

One or more DL TX beams and one or more UL RX beams may be associated. Association between one or more DL TX beams and one or more UL RX beams may be signaled via system information, minimum system information, remaining minimum system information or other system information. SS block(s), PRACH resource(s), preamble time resources, preamble frequency resources and/or preamble sequence(s) may each be associated with one or more of each other. Association between an SS block, a PRACH resource and/or a preamble sequence may be signaled via system information, minimum system information, remaining minimum system information or other system information.

However, when gNB TX/RX reciprocity is present, the PRACH resources may be defined by a frequency index only. This is because a WTRU may select a preamble and transmit the selected preamble on the PRACH frequency resources at time y to identify the SS block and feedback the SS block time index if the PBCH is received at time x. For example, a WTRU may select a preamble, such as preamble index n, and transmit the selected preamble on the PRACH frequency resource, say frequency resource index m, at time y to identify the n-th SS block and feedback the SS block time index. In this case, the n-th SS block may be associated with the preamble index n and frequency resource index m. In an example, a WTRU may not transmit the selected preamble at an undetermined time. A WTRU may only transmit the selected preamble at the time when the gNB has the best RX beam present. An advantage in this example may be that the preamble may be received by gNB using the best RX beam.

In an example, a WTRU may use only a preamble, for example, a preamble resource, sequence, or the like, to report a detected SS/PBCH block. The preamble may carry or contain SS/PBCH block information where different preambles, such as sequences and/or resources, may indicate different SS/PBCH blocks. Preamble number x may be used to indicate or report SS/PBCH block number x. In the examples herein, a preamble may be a preamble sequence, preamble resource or combination of the same. A preamble resource may be a preamble time resource, frequency resource, preamble spatial resource or combination of the same.

One or more preambles such as one or more preamble sequences and/or resources may be used to indicate or report different SS/PBCH blocks. For example, preamble sequence number x may correspond to SS/PBCH block number x. A WTRU may use preamble sequence number x to indicate or report SS/PBCH block number x. When a WTRU determines to indicate or report SS/PBCH block number x, WTRU may select preamble sequence number x and transmit the selected preamble sequence number x.

In another example, preamble time resource number x may correspond to SS/PBCH block number x. A WTRU may use preamble time resource number x to request SS/PBCH block number x. When a WTRU determines to indicate or report SS/PBCH block number x, WTRU may select preamble time resource number x and transmit the preamble sequence in preamble time resource number x.

For yet another example, preamble frequency resource number x may correspond to SS/PBCH block number x. A WTRU may use preamble frequency resource number x to indicate or report SS/PBCH block number x. When a WTRU determines to indicate or report SS/PBCH block number x, WTRU may select preamble frequency resource number x and transmit the preamble sequence in preamble frequency resource number x.

An association between an SS/PBCH block and a preamble may be used. An association between an SS/PBCH block and a preamble time resource, frequency resource, preamble sequence or any combination of them may be used.

An association between a preamble sequence and an SS/PBCH block may be used. As one example association, one preamble may be associated with one SS/PBCH block. Preamble sequence number x may be associated with SS/PBCH block number x. When a WTRU determines to indicate or report SS/PBCH block number x, the WTRU may select preamble sequence number x and transmit it. As another example association, one preamble may be associated with multiple SIBs. Preamble sequence number x may be associated with SS/PBCH block number x and SS/PBCH block number y. When a WTRU wants to request SS/PBCH block number x or SS/PBCH block number y, the WTRU may select preamble sequence number x and transmit it. As yet another example association, multiple preamble sequences may be associated with one SS/PBCH block. Preamble sequence number x and number y may be associated with SS/PBCH block number x. When a WTRU wants to request SS/PBCH block number x, the WTRU may select preamble sequence number x or number y and transmit either Preamble sequence number x or number y. WTRU may transmit both Preamble sequence number x and number y when multiple preamble sequence transmission is used or enabled.

An association between one or more preamble time resources and one or more SS/PBCH blocks may be used. As one example association, one preamble time resource may be associated with one SS/PBCH block. Preamble time resource number x may be associated with SS/PBCH block number x. When WTRU wants to indicate or report SS/PBCH block number x, WTRU may select preamble time resource number x and transmit the preamble sequence. As another example association, one preamble time resources may be associated with multiple SIBs. Preamble time resource number x may be associated with SS/PBCH block number x and SS/PBCH block number y. When WTRU wants to indicate or report SS/PBCH block number x or SS/PBCH block number y, WTRU may select preamble time resource number x and transmit the preamble. As yet another example association, multiple preamble time resources may be associated with one SS/PBCH block. Preamble time resources number x and number y may be associated with SS/PBCH block number x. When WTRU wants to indicate or report SS/PBCH block number x, WTRU may select preamble time resources number x or number y and transmit the preamble. WTRU may transmit the preamble in both Preamble time resources number x and number y when multiple preamble time resources transmission is used or enabled.

Similarly, an association between one or more preamble frequency resources and one or more SS/PBCH blocks may be used. Likewise, an association between any one of one or more preamble time/frequency resources, one or more sequences and one or more SS/PBCH blocks may be used.

If WTRU receives an indication with the association for a preamble and an SS/PBCH block, WTRU may use the preamble to indicate or report an SS/PBCH block. In an example, the preamble may be a preamble sequence, preamble resource and the like. If WTRU does not receive an indication with the association for preamble and SS/PBCH block, WTRU may use a control field in a payload, such as a RACH message 3, to indicate or report the SS/PBCH block.

A single association or mapping may be used. An association indication of 1 bit may be used. WTRU may be indicated either with or without association, for example, "1" may indicate "with association" and "0" may indicate "without association".

In another example, more than one associations or mappings may be used. An association indication of N bits may be used. Two examples may be used. In a one example, two indicators may be used, a first indicator may indicate with association or without association. In an example, the first indicator may be one bit. A second indicator (N bits) may be used to indicate which association should be used if the WTRU receives the first indicator indicating with association. In an example, the second indicator may be N bits. In another example, a single indicator with joint coding of "with" and "without" association and multiple associations. In an example, the single indicator may be N bits. In an example of 3 associations, a two-bit single indicator may be used. Accordingly, the bits 00 may indicate without association. Further, the bits 01, 10 and 11 may indicate a first association, a second association and a third association, respectively. The first association, the second association and the third association may be labeled "association 1", "association 2" and "association 3" respectively.

An association indication may be part of a RACH configuration and may be carried or included in a broadcast signal or channel such as a remaining minimum system information (RMSI) signal. The association indication may also be carried in a SS, new radio PBCH (NR-PBCH), or other system information (OSI).

The association between SS/PBCH blocks and PRACH preamble (sequence, resource, their indices) may be based on the actually transmitted SS/PBCH blocks which may be indicated in RMSI. In another example, the association between SS blocks and PRACH preamble (sequence, resource, their indices) may be based on the maximum SS/PBCH blocks which may be predetermined according to frequency bands.

The available number of NR-RACH preamble in a cell may be determined by $$M = L' \cdot K \qquad \text{Equation (1)}$$

where L' may the number of actually transmitted SS-blocks within an SS block set and K may the number of preambles associated with each SS-block. In an example, for a one-to-one association of preambles and SS blocks, K may be 1.

The association may be done by mapping the consecutive M preambles in a cell to the L' number of SS-blocks or SS/PBCH blocks. Also, K consecutive preambles may be mapped to each SS-block.

The preambles in a cell may be associated or mapped to SS/PBCH block based on at least one of the following: cyclic shifts of a root Zadoff-Chu sequence, a root index of the Zadoff-Chu sequence, an NR-RACH preamble time instances within a slot, a slot index, a frequency index (which may include, for example, a subcarrier index, a PRB index and the like) and the like.

In an example association, the set of NR-RACH preamble sequences in a cell may be determined in the order of the available cyclic shifts of a root Zadoff-Chu sequence, an increasing NR-RACH preamble time instances within a slot, an increasing root index, an increasing frequency index and an increasing slot index. In another example, the set of NR-RACH preamble sequences in a cell may be determined in the order of the cyclic shifts of a root Zadoff-Chu sequence, increasing root index of Zadoff-Chu sequence, increasing NR-RACH preamble time instances within a slot, increasing slot index and increasing frequency index.

A gNB may configure a WTRU to report an additional SS/PBCH block index, for example, a strongest SS/PBCH block index, through a message of contention based random access. In an example, the message may be a message 3 of contention based random access.

The gNB may configure the WTRU to report the multiple SS/PBCH block indices through a PRACH preamble during a contention-free random access procedure, such as, for example, in a handover. The gNB may be configured to report the multiple SS/PBCH block indices through one or more PRACH preambles during a contention-based random access procedure.

In a further example, the best gNB RX beam may be identified without an RX beam sweeping or training at a gNB RX site. This may reduce the beam sweeping or training overhead and latency. The drawback is that PRACH resources may be reduced for a given WTRU because now the WTRU may not have freedom to use resources of the WTRU's choosing in the time domain. A WTRU may only have freedom in the frequency domain. This may increase transmission collision probabilities. However, since WTRUs may be forced to transmit the preamble at different time instances, such preamble transmission may also reduce the collision probabilities for the preamble transmissions. In case WTRUs are covered by the same beam, WTRUs collision probabilities may be increased since WTRUs may each have to send a preamble in the same time instance in the same beam without spatial separation.

For the WTRUs in different beams, transmission collision may be reduced since WTRUs are separated in time. This solution may be referred to as autonomous beam scheduling. That is, the time index for a detected best gNB TX beam may automatically determine the PRACH resources in the time domain for a WTRU though not in the frequency domain, and the best gNB RX beam may be automatically scheduled. The solution may be considered to be autonomous TDMA for the RACH.

In an example, the best gNB TX beam may indicate a set of best gNB RX beams, such as beam set Q. A WTRU may need to send preambles one at a time at time. For example, a WTRU may need to send preambles at time x+nc, time x+nc+1, time x+nc−1 and so on, where n is a positive integer if this beam set is plus and minus the index of the best gNB TX beam. This may be called a local beam set. The local beam set may be considered to be local with respect to the index of the best SS/PBCH block or gNB TX beam.

In another example, a beam set may also be non-local. A WTRU may send a preamble randomly at one or multiple PRACH time resources, such as time x+nc, time x+nc+1, time x+nc−1 and so on. In an example, X may be the index of the best SS/PBCH block or gNB TX beam, n may be an integer number and c may be a constant for different designs. Therefore, PRACH resources may be defined by time index, which may be a local time index and a frequency index, which may be a global frequency index. This local time index may be local with respect to the index of the best SS/PBCH block or gNB TX beam. Also, the global frequency index may be global with respect to the index of the best SS/PBCH block or gNB TX beam.

Figure 8:
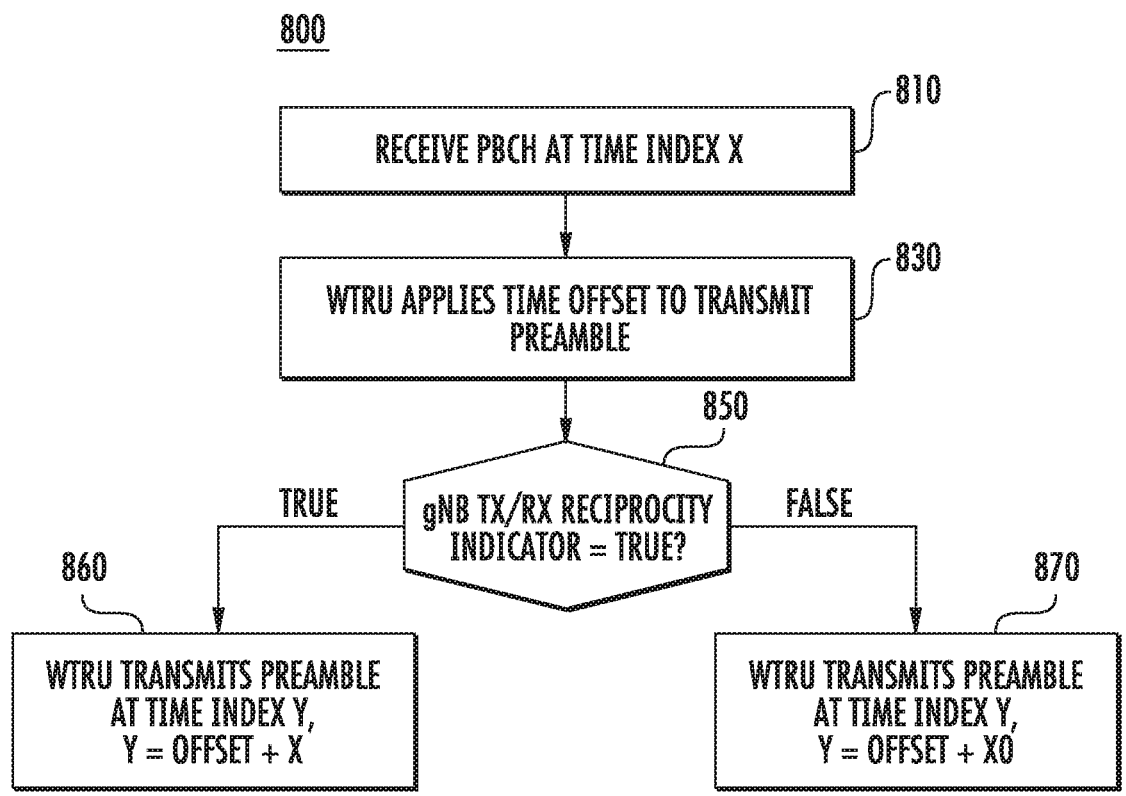
FIG. 8 is a flowchart diagram which illustrates an example of a WTRU procedure for a beam operation mode.

FIG. 8 is a flowchart diagram which illustrates an example of a WTRU procedure for a beam operation mode. As shown in flowchart diagram 800, a WTRU may receive a PBCH at time index x 810. The WTRU may apply a time offset to a transmit preamble 830. A WTRU may also receive gNB TX/RX reciprocity indication. The WTRU may determine if the gNB TX/RX reciprocity indication is true or false 850. In an example, if gNB TX/RX reciprocity indicator=TRUE, the WTRU may transmit a preamble at time index y, where y=offset+x 860. Otherwise the WTRU may transmit a preamble at time index y, where y=offset+$x_0$ 870.

In an example, a TX/RX beam reciprocity determination, a TX/RX beam refinement, or both may be performed. For example, a gNB may have knowledge or information for TX/RX beam reciprocity. A gNB may also determine or refine the TX/RX beam reciprocity by a training method. Such an example solution may be used for, and is not limited to, an example configuration as follows.

In an example, the best SS/PBCH block may be SS/PBCH block index x and the best PRACH preamble and/or resource may be PRACH preamble sequence/resource index y. In another example, the best TX beam may be beam x and the best RX beam may be beam y. In a further example configuration, y=x, and this may be referred to as full beam reciprocity. In another example configuration, y=x+Δ where Δ=±1,0, ±2 or Δ=±1, ±2, and the like. This is may be referred to as partial beam reciprocity. In an additional example configuration, y≠x and y=x+Δ does not hold. This may be referred to as no beam reciprocity.

A beam sweep or training may be used to determine or refine TX/RX beam reciprocity. A multi-stage solution may be used, in example. For example, in an example stage, a full beam sweep may be performed. In a further example stage, TX/RX beam reciprocity may be decided or refined. In another example stage, a power saving beam sweep or training may be performed to update the beam reciprocity.

In an example, a WTRU TX beam may be mapped to a WTRU RX beam. If a WTRU receives the PBCH at the best WTRU RX beam z, then the WTRU may send a preamble using the WTRU TX beam z if WTRU TX/RX beam reciprocity is present. Otherwise, the WTRU may need to send the preamble by sweeping all WTRU TX beams one at a time at time x+nc where n is a positive integer.

In a further example, the best WTRU RX beam may indicate a set of best WTRU TX beams. In an example, the set of best WTRU TX beams may be a beam set Q. The WTRU may need to send a preamble by sweeping this beam set Q of WTRU TX beams one at a time at time x+nc where n is a positive integer. Such a beam set may be predefined, via a master information block (MIB)/SIB or via a configuration.

Exemplary methods and procedures for determining beam reciprocity, beam correspondence or both are disclosed herein. Beam reciprocity/correspondence for one or more WTRU TX/RX beams may be determined via the following example steps. It may be understood to one skilled in the art that certain steps may be performed out of order or not performed at all. Other steps may be performed in-between the steps provided herein. In step 1, a WTRU may perform TX beam sweeping. In step 2, a TRP may determine one or more WTRU TX beams based on a measurement performed at the TRP. In step 3, the TRP may indicate or transmit information regarding the determined WTRU TX beam information based on the determined one or more WTRU TX beams in step 2. The beam index or beam indices of the determined one or more beams may be signaled to the WTRU via, but not limited to, RAR, NR-PRACH message 4, NR-PDCCH, NR-enhanced PDCCH (ePDCCH), medium access control element (MAC CE), RRC signaling or the like.

In step 4, a WTRU may perform RX beam sweeping. In step 5, the WTRU may determine one or more RX beams based on one or more measurements. In step 6, the WTRU may derive TX beam or beams using the determined RX beam or beams in step 5, assuming beam reciprocity/correspondence at the WTRU. In step 7, the indicated one or more beams in steps 3 and the derived one or more beams in step 6 may be compared at the WTRU, and the WTRU may determine a final beam reciprocity/correspondence at the WTRU based on a rule or a set of rules. For example, if the indicated and derived beams in steps 3 and 6 are the same, full beam reciprocity/correspondence at the WTRU may be declared and determined. If the indicated and derived beams in steps 3 and 6 are partially the same, partial beam reciprocity/correspondence at the WTRU may be declared and determined. If the indicated and derived beams in steps 3 and 6 are totally different, no beam reciprocity/correspondence at the WTRU may be declared and determined.

In order to determine beam reciprocity/correspondence for one or more TRP TX/RX beams, the following steps may be performed. It may be understood to one skilled in the art that certain steps may be performed out of order or not performed at all. Other steps may be performed in-between steps.

In step 1, a TRP may perform TX beam sweeping. In step 2, a WTRU may determine one or more TRP TX beams based on one or more measurements. In step 3, a WTRU may inform, indicate or transmit information regarding the determined TRP TX beam information based on the determined beam or beams in step 2. The determined beam index or beam indices may be fed back to the TRP via, but not limited to, WTRU feedback, CSI feedback, NR-PRACH message 1, one or more preambles, NR-PUCCH, NR-PUSCH, scheduling request (SR) or the like.

In step 4, the TRP may perform RX beam sweeping. In step 5, the TRP may determine one or more RX beams based on one or more measurements. In step 6, the TRP may derive TX beam or beams using the determined RX beam or beams in step 5 assuming beam reciprocity/correspondence at the TRP. In step 7, the indicated one or more beams in steps 3 and the derived one or more beams in step 6 may be compared at the TRP, and the TRP may determine final beam reciprocity/correspondence at the TRP based on a rule or a set of rules. For example, if the indicated and derived beams of steps 3 and 6 are the same, full beam reciprocity/correspondence at TRP may be declared and determined. If the indicated and derived beams of steps 3 and 6 are partially the same, partial beam reciprocity/correspondence at TRP may be declared and determined. If the indicated and derived beams in steps 3 and 6 are totally different, no beam reciprocity/correspondence at TRP may be declared and determined.

Measurements or metrics to determine beams or beam reciprocity/correspondence may be based on but not limited to signal to noise ratio (SNR), signal to interference plus noise ratio (SINR), signal strength, power, beam-quality, CSI or the like.

A WTRU beam correspondence or reciprocity may be determined using one or more of the methods and procedures described herein. Once a WTRU beam correspondence or reciprocity has been determined, the results of the determined beam correspondence or reciprocity may be signaled or indicated to the other side of the wireless connection. For example, if a WTRU determines the beam correspondence or reciprocity, the WTRU may provide feedback including the results of the determined beam correspondence or reciprocity to a gNB, TRP or other WTRU. Such feedback may be semi-static or dynamic. For example, the results of a determined beam correspondence or reciprocity may be fed back via, but not limited to, an initial uplink transmission, WTRU feedback, CSI, an NR-PRACH message 1, one or more preambles, an NR-PRACH message 3, NR-PUCCH, NR-PUSCH, SR, MAC, MAC CE, RRC signaling, side link transmission or the like. Such feedback may be either periodic, aperiodic, per request or based on demand. Such feedback for results of WTRU beam correspondence or reciprocity may be initiated by the WTRU, TRP or both. Such feedback for results of WTRU beam correspondence or reciprocity may be triggered by an event.

In another example, a WTRU may provide feedback including results of a determined beam correspondence or reciprocity to a gNB, TRP or other WTRU as part of a WTRU capability indication. For example, one or more results of a determined beam correspondence or reciprocity alone or along with a WTRU capability may be signaled or indicated to a gNB, TRP or other WTRU, from the given WTRU, via an initial uplink transmission, NR-PRACH message 1, one or more preambles, RRC connection establishment request, NR-PRACH message 3, RRC signaling, side link transmission or the like.

Figure 9:
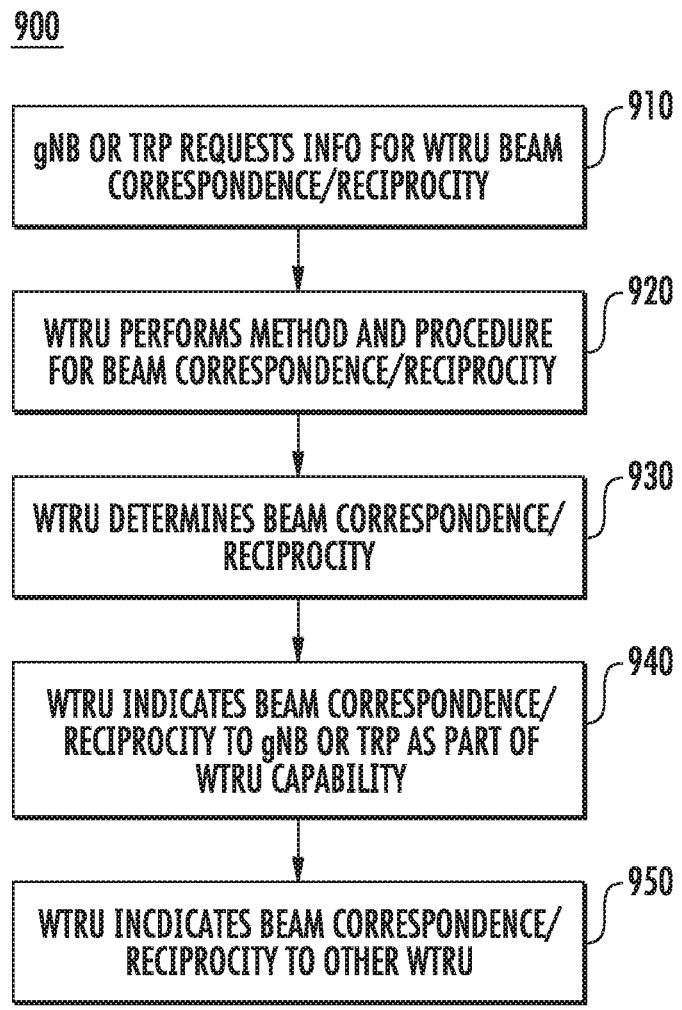
FIG. 9 is a flowchart diagram which illustrates an example WTRU method and procedure for determining and reporting WTRU beam correspondence, beam reciprocity or both.

FIG. 9 is a flowchart diagram which illustrates an example WTRU method and procedure for determining and reporting WTRU beam correspondence, beam reciprocity or both. In an example shown in flowchart diagram 900, a gNB or TRP may request information for WTRU beam correspondence, beam reciprocity or both 910. A WTRU may perform a method and procedure for beam correspondence/reciprocity 920. In an example, the WTRU may perform the method and procedure for beam correspondence/reciprocity based on the request received from the gNB or TRP. In another example, a WTRU may perform the method and procedure for beam correspondence/reciprocity without receiving a request from a gNB or TRP.

Further, the WTRU may send an indication of the beam correspondence/reciprocity determination to a gNB or TRP in a predetermined procedure. Such procedure may be via an initial access procedure, a random access procedure or RRC procedure during an RRC connection stage. A WTRU may determine beam correspondence/reciprocity according to one or more results of the method and procedure for beam correspondence/reciprocity determination 930. In an example, the WTRU may determine beam correspondence/reciprocity by following a method and procedure for beam correspondence/reciprocity determination provided elsewhere herein. In an example, a WTRU may indicate information of beam correspondence/reciprocity to a gNB or TRP as part of a WTRU capability indication 940. A WTRU may also indicate beam correspondence/reciprocity to other WTRUs 950. In an example, the WTRU may also indicate beam correspondence/reciprocity to other WTRUs, if necessary.

A WTRU may indicate beam correspondence or reciprocity information to a gNB or TRP as part of the WTRU capability transmission. The capability transmission may include full or no beam correspondence or reciprocity, or full, partial or no beam correspondence or reciprocity. Additional categories for beam correspondence or reciprocity may also be reported.

In an example, a preamble may be used to indicate a best DL beam for an RAR. A best DL PBCH beam may be used for an RAR DL beam if such a DL beam does not change. Such an association may be done in a synchronous fashion in time (or frequency) at a beam level. However, such an association should be within a coherent time. Several reasons may cause such DL beams for SYNC, PBCH and RAR to change, including: if a channel change is very fast; if a change due to WTRU rotation or blockage occurs; if the network decides to use a different DL beam, beamwidth or beam order; or the like.

Therefore, methods to indicate the best DL beam for RAR are needed in some cases when a gNB changes the beam sweep order for an RAR which is different from the beam sweep order for a PBCH. When such association is not present or not used, an alternative solution may be used. For example, a preamble may be used for such an indication.

In an example, a preamble may be used to indicate one of the M DL beams. Different preamble groups may be designed. In this case, a preamble may be designed with M groups, where each group may indicate one of the M DL beams. When a WTRU performs random access, the WTRU may select a preamble from the corresponding preamble group associated with the detected DL beam. When a gNB detects the preamble, may know which preamble group the detected preamble belongs to, and thus which DL beam may be used for a following DL transmission, such as for RAR transmission. A DL beam is separated in the spatial domain usually in different beam directions, therefore when WTRU selects preamble, there may be no interference from each other, and no collision may occur. Both preambles may be received, and the same random access (RA)-radio network temporary identifier (RNTI) may be sent.

Further, an RAR message may not collide due to spatial separation. When two or multiple WTRUs detect the same DL beam, and select the same preamble group, since there are fewer preambles in the smaller group, the likelihood may increase that two WTRUs may select the same preamble, thus collision may occur in RAR. However since the beam is narrow, fewer WTRUs may reside in the same narrow beam, and this may reduce the chance that multiple WTRUs may initiate the random access procedure. Collision may be proportional to the number of WTRUs and inversely proportional to the number of preambles.

In an example, the number of WTRUs and the number of preambles may cancel out each other in terms of collision probability. In such an example, the collision probability may remain otherwise the same. Other methods using a different cyclic shift of the same root sequence, different root sequence or combination of the two may also be used.

In a further example, the indication for WTRU TX/RX beam reciprocity may be a function of the preamble format such as a long/short format, a preamble sequence length, a preamble group, a preamble sequence, a root index, a cyclic shift, one or more frequency/time/spatial resources, or the like, or a combination of them.

In addition, the indication for the desired TRP TX beam index or indices may be a function of preamble format such as a long/short format, a preamble sequence length, a preamble group, a preamble sequence, a root index, a cyclic shift, one or more frequency/time/spatial resources, or the like, or combination of them.

A synchronous design may be simple and incur less overhead, but a synchronous design may offer lower flexibility since a fixed association is needed and a resource is determined by association. Thus, the fixed association and resource determined by association may lower flexibility. But a synchronous design may reduce the overhead due to the use of additional signaling for the TX/RX beam reciprocity indication.

A preamble may be used to indicate different service types. By selecting a preamble from one of the M preamble groups, the preamble may indicate eMBB, URLLC, and mMTC, in addition to a DL beam for RAR. A preamble may also indicate different combinations of low latency and payload size.

The indication for a service type may be a function of a preamble format such as a long/short format, a preamble sequence length, a preamble group, a preamble sequence, a root index, a cyclic shift, one or more frequency/time/spatial resources, or the like, or combination of them.

In an example, the RA-RNTI may be computed based on the SS/PBCH block index associated with the RACH preamble in addition to a slot index and a frequency index in which the preamble was transmitted in time and frequency.

In another example, the RA-RNTI may also be calculated based on a time index and a frequency index. The time index may be a unique value within a RACH resource group. The time index may be a function of a slot index and a starting symbol index within the slot.

In a further example, time index in the RA-RNTI may be based on one of the following: the subframe number, the symbol number, the slot number and the RACH occasion index within a radio frame.

A RACH resource group may be a set of RACH resources sharing the same RA-RNTI. A downlink control information (DCI) message in a PDCCH scheduling one or more RAR messages on the PRACH preamble on each of the RACH resources within the RACH resource group may be masked with the same RA-RNTI. A gNB or network may indicate the number of RACH resources per RACH resource group. The gNB or network may indicate the number of random access preamble IDs (RAPIDs). The WTRU may calculate the number of preambles per RACH resource within a RACH resource group.

One or more PRACH resources may be obtained from a PBCH and/or other sources with and without association. A PBCH may be used to configure beam resources and PRACH resources, such as, for example, time, frequency, code and the like. Beam resources may also be a part of PRACH resources. Furthermore, a PBCH may be used to jointly configure PRACH resources, such as, for example, time, frequency, code and the like. A PBCH may be associated with a PRACH with a synchronous resources allocation for the PRACH. By detecting the PBCH DL beam, a WTRU may obtain the time and beam resources for a preamble transmission. When a preamble group is also associated with beam, by detecting the PBCH DL beam, a WTRU may also obtain the code resources. In an example, the WTRU obtaining the code resources may include the WTRU obtaining the preamble group. A PBCH DL beam may also be associated with frequency resources by modulo operation.

Synchronous PBCH/PRACH may be designed in two stages. One example stage may include determining the resources for time, beam and code. Another example stage may include determining frequency resources. If a frequency resource index is denoted as $f_{id}$, the frequency resource may be determined by Equation 1:

$$f_{id} = \text{Beam Index mod } N_F \quad \text{Equation (2)}$$

where $N_F$ is the maximum range of $f_{id}$. For example, if $0 \leq f_{id} < L$, then $N_F = L$.

In an example, an asynchronous design may use a dynamic or semi-static signaling or combination of the two. In another example, an asynchronous design may use a predefined mapping. For example, an angle of departure (AoD), an angle of arrival (AoA) or an overlap beam or beams may be used as resources. An AoA or an AoD may be estimated during initial synchronization or PBCH transmission.

A beam sweep method for the next stage may be indicated by the preamble. A beam sweep method may be a function of time, frequency, code, number of sweeps, number of symbols per sweep, periodicity, and the like.

A PBCH transmission in DL may be associated with PRACH transmission in UL. PBCH-to-PRACH association may be established so that when a WTRU detects the best PBCH TX beam, it may automatically obtain the knowledge about the best preamble gNB RX beam if gNB TX/RX beam reciprocity is present. If PBCH transmission is not associated with PRACH transmission, when a WTRU detects the best PBCH TX beam, it may not know the best preamble gNB RX beam even if gNB TX/RX beam reciprocity is present. Therefore, the WTRU may need the PBCH to indicate the best preamble gNB RX beam. In another example, a SIB, such as a SIB1, may be used to configure preamble and RACH resources.

Figure 10:
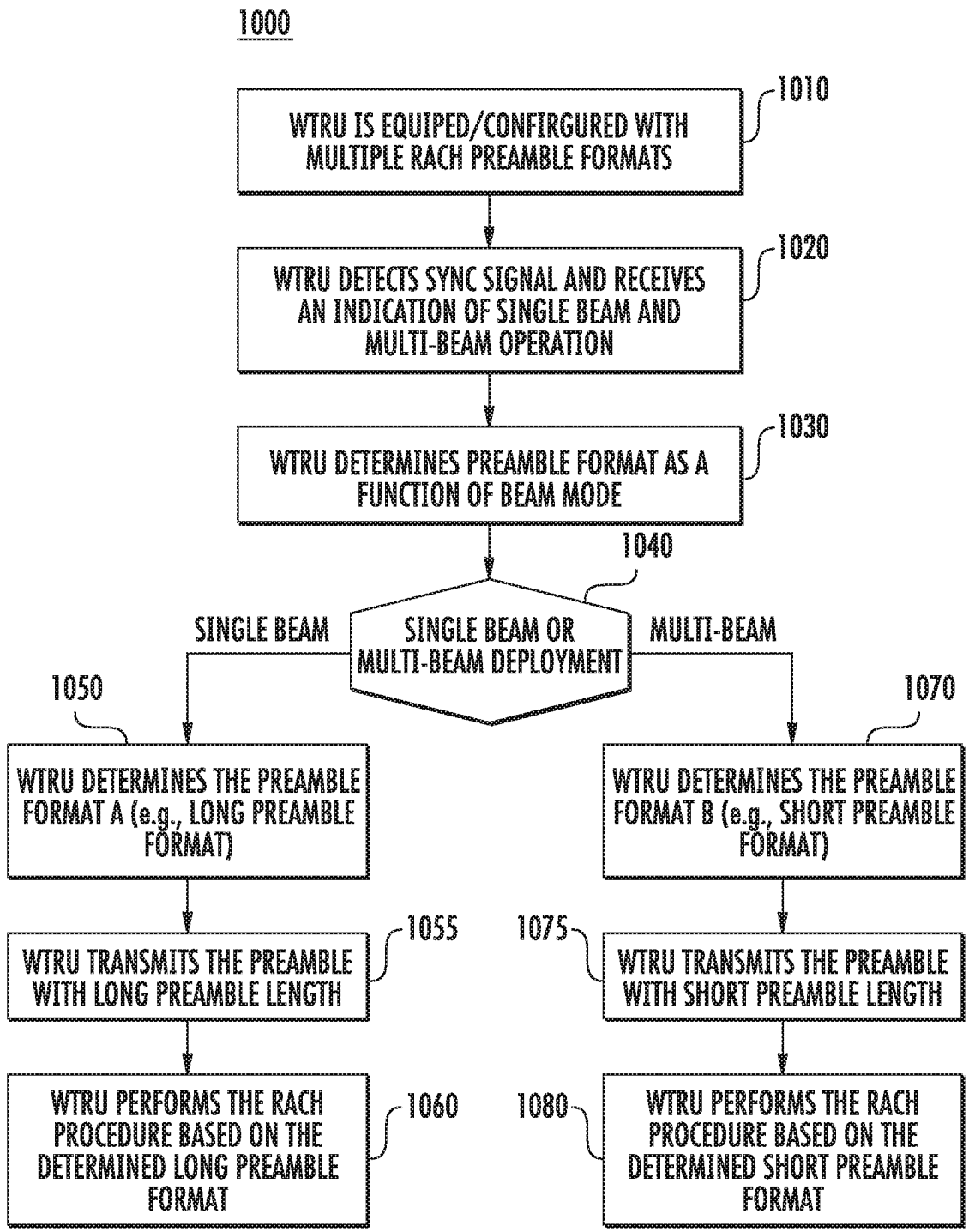
FIG. 10 is a flowchart diagram which illustrates an example Physical Random Access Channel (PRACH) procedure and preamble format selection based on beam deployment.

FIG. 10 is a flowchart diagram which illustrates an example PRACH procedure and preamble format selection based on beam deployment. In an example shown in flowchart diagram 1000, the beam deployment may be an indicated beam deployment. As shown in flowchart diagram 1000, a WTRU may be equipped and/or configured with multiple RACH preamble formats 1010. In an example, the RACH preamble formats may include long and short preamble formats. The WTRU may detect a SYNC signal and receive an indication of single beam or multi-beam operation 1020. Further, the WTRU may determine the preamble format as a function of beam deployment or beam operation mode 1030. Further, the WTRU may determine whether a single beam deployment or multi-beam deployment is indicated 1040.

If a single beam deployment or single beam operation mode is indicated, the WTRU may determine the preamble format 1050. Further, the WTRU may transmit the preamble with the determine preamble length 1055. Then, the WTRU may perform the RACH procedure based on the determined preamble format 1060. For example, the WTRU may determine a first preamble format. In an example, the first preamble format may be preamble format A. In a further example, the WTRU may determine a long preamble format as preamble format A. Further, the WTRU may transmit the preamble with a long preamble length. The WTRU may perform the RACH procedure based on the determined long preamble format.

If a multi-beam deployment or a multi-beam operation mode is indicated, the WTRU may determine the preamble format 1070. Further, the WTRU may transmit the preamble with the determine preamble length 1075. Then, the WTRU may perform the RACH procedure based on the determined preamble format 1080. For example, the WTRU may determine a second preamble format. In an example, the second preamble format may be preamble format B. In a further example, the WTRU may determine a short preamble format as preamble format B. Further, the WTRU may transmit the preamble with a short preamble length. The WTRU may perform the RACH procedure based on the determined short preamble format.

Figure 11:
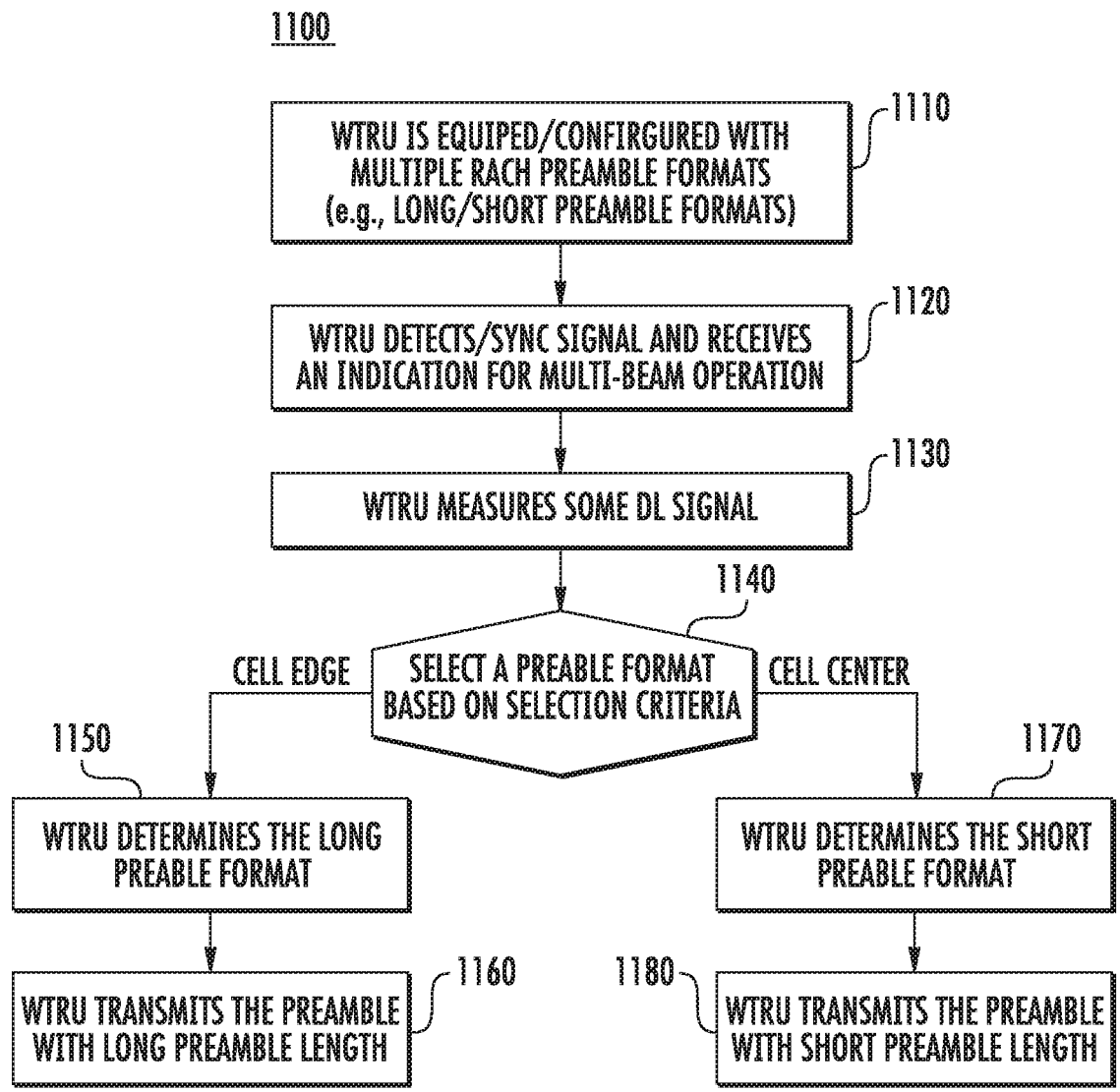
FIG. 11 is a flowchart diagram which illustrates another example PRACH procedure and preamble format selection.

FIG. 11 is a flowchart diagram which illustrates another example PRACH procedure and preamble format selection. As shown in flowchart diagram 1100, a WTRU may be equipped and/or configured with multiple RACH preamble formats, for example, long and short preamble formats 1110. The WTRU may detect a SYNC signal and receive an indication for multi-beam operation 1120. Further, the WTRU may measure a DL signal, for example, a SYNC, a PBCH, or a broadcast reference signal (BRS) signal 1130. Also, the WTRU may select a preamble format based on preamble format selection criteria 1140. The preamble format selection criteria may include, for example, a reference signal received power (RSRP), reference signal received quality (RSRQ), cell center indication or cell edge indication. The WTRU may determine the long preamble format and transmit the preamble with long preamble length if RSRP is below a predetermined threshold or a cell edge is indicated. Otherwise, the WTRU may determine the short preamble format and transmit the preamble with short preamble length.

For example, if a cell edge is indicated, the WTRU may determine the long preamble format 1150. Further, the WTRU may then transmit the preamble with long preamble length 1160.

In another example, if a cell center is indicated, the WTRU may determine the short preamble format 1170. Further, the WTRU may then transmit the preamble with short preamble length 1180.

Figure 12:
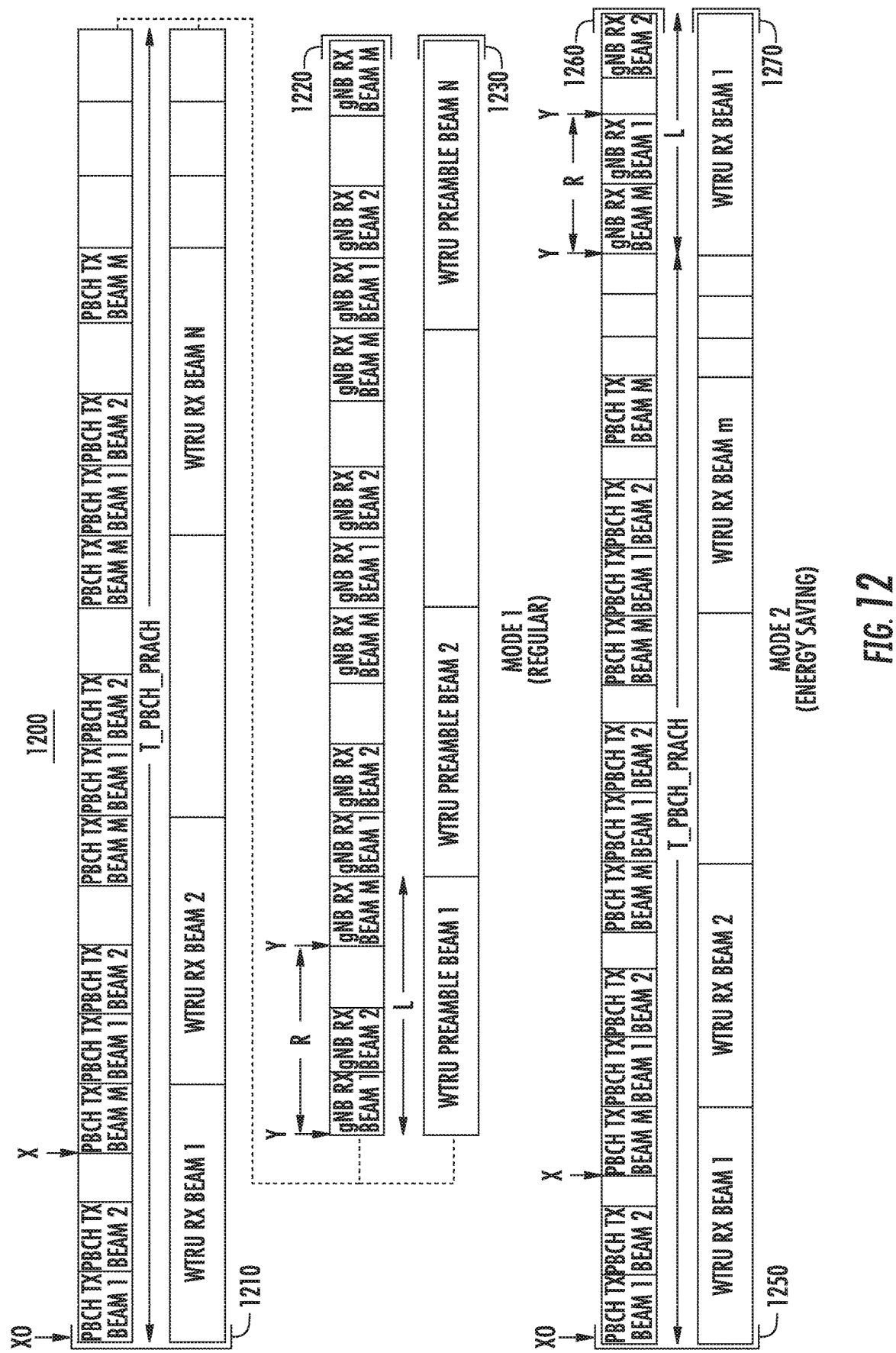
FIG. 12 is a network operation diagram which illustrates a network operation mode with an energy saving mode WTRU.

FIG. 12 is a network operation diagram which illustrates a network operation mode with an energy saving mode WTRU. As shown in an example in network operation diagram 1200, when operating in a regular mode 1210, a WTRU may perform a full beam sweep. In an example, regular mode 1210 may be a first mode. Further, the first mode may be referred to as mode 1. As seen in FIG. 12, the gNB may transmit and receive using beams 1220 and the WTRU may transmit and receive using beams 1230. When operating in an energy efficiency mode 1250, a WTRU may perform a short beam sweep or no beam sweep. In this mode, the gNB may transmit and receive using beams 1260 and the WTRU may transmit and receive using beams 1270. In an example, the energy efficiency or low latency mode 1250 may be referred to as a second mode. In a further example, the second mode may be referred to as mode 2.

Therefore, two operation modes may be needed to achieve energy efficiency. When TX/RX beam reciprocity at WTRU is not present, a gNB and WTRU may operate in mode 1. When TX/RX reciprocity at WTRU is present, a gNB and WTRU may operate in mode 2. WTRU may report its TX/RX reciprocity to a gNB in order for the gNB to decide which mode it may operate. Each WTRU may report its own TX/RX reciprocity to a gNB, for example, as part of WTRU capability or as part of CSI feedback. When all WTRUs in a TRP or cell have TX/RX reciprocity, a TRP or a gNB may configure and operate in mode 2 for the TRP or cell. Furthermore when all WTRUs in a beam have TX/RX beam reciprocity, gNB may configure and operate in mode 2 for the beam. Therefore a beam, a TRP or a cell may operate in either mode 1 or mode 2. In an example, a gNB may switch to mode 2 for energy efficiency when a condition is met. A gNB may switch back to mode 1 for regular operation when a condition is not met.

Figure 13:
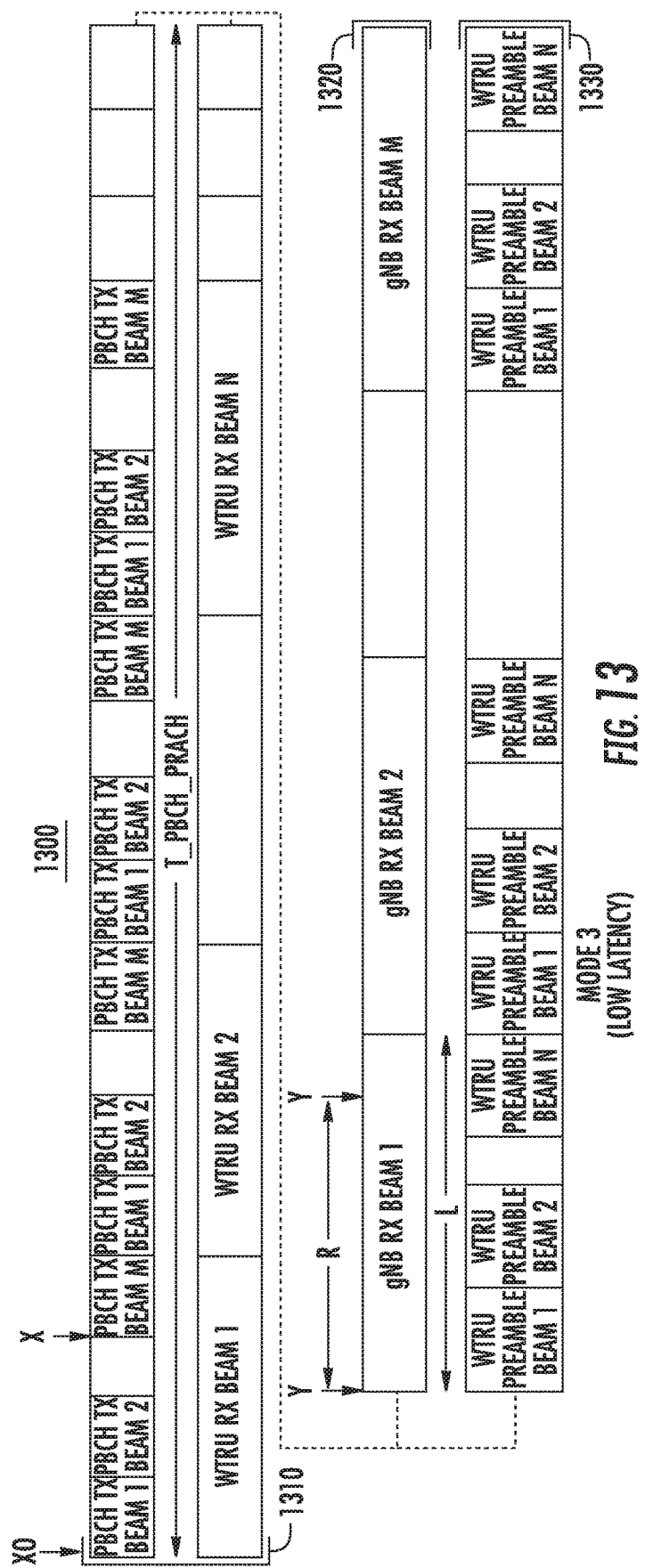
FIG. 13 is a network operation diagram which illustrates a network operation mode with a low latency mode.

FIG. 13 is a network operation diagram which illustrates a network operation mode with a low latency mode. As shown in an example in network operation diagram 1300, a low latency mode 1310 may be used. In an example, low latency mode 1310 may be a third mode. Further the third mode may be referred to as mode 3. As shown in FIG. 13, the gNB may transmit and receive using beams 1320 and the WTRU may transmit and receive using beams 1330.

In an example, when gNB TX/RX reciprocity is present, mode 3 may be used. In mode 3, a gNB may operate an RX period with each gNB RX beam allowing all WTRU TX preamble beams to perform a training with a full sweep. Because a gNB has TX/RX reciprocity, each WTRU may know when to send its preamble. Therefore, each WTRU may finish preamble transmission of all WTRU TX beams in a very short period. Some WTRUs may finish preamble in a shorter time and some may finish in a longer time, depending on the gNB RX beam for the WTRU. However compared to the regular case where all WTRUs will finish preamble training at the same but much longer time, mode 3 offers a comparatively lower latency operation.

In summary, mode 1 may be operated when no TX/RX beam reciprocity is present at both a gNB and an WTRU. Mode 2 may be operated when TX/RX beam reciprocity is present at the WTRU. Mode 2 may achieve better energy savings. Mode 3 may be operated when gNB TX/RX beam reciprocity is present. Mode 3 may achieve low latency operation. When both gNB and WTRU have TX/RX beam reciprocity, an energy efficiency and low latency mode may be used. Such an energy efficiency and low latency mode may be a fourth mode. The fourth mode may be referred to as mode 4.

Figure 14:
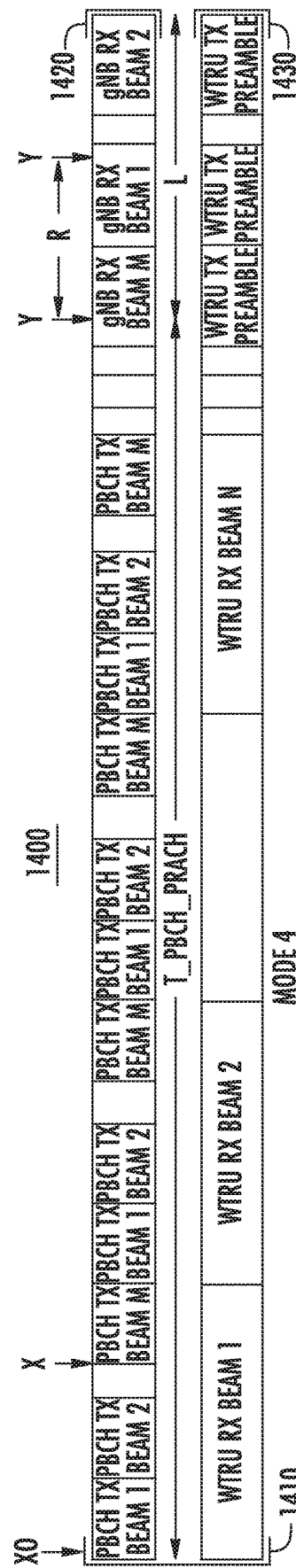
FIG. 14 is a network operation diagram which illustrates a network operation in energy saving mode and low latency mode.

FIG. 14 is a network operation diagram which illustrates a network operation in energy saving mode and low latency mode. As shown in an example in network operation diagram 1400, an energy saving mode and low latency mode 1410 may be used. In an example, energy saving mode and low latency mode 1410 may be referred to as mode 4. Mode 4 may achieve both energy efficiency and low latency. Further, the gNB may transmit and receive using beams 1420 and the WTRU may transmit and receive using beams 1430.

In an example, in order to make the network operate more efficiently, a gNB may indicate an operation mode to the WTRU. For example, three example options for such an indication may be used. In an example option, an operation mode may be indicated in a PBCH either explicitly or implicitly. In another example option, an operation mode may be indicated in a SIB either explicitly or implicitly. In a further example option, an operation mode may be indicated in SYNC either explicitly or implicitly. In another example, for mode 3, parameter N may be predefined or configured as a number of WTRU RX beams to participate in an operation.

Figure 15:
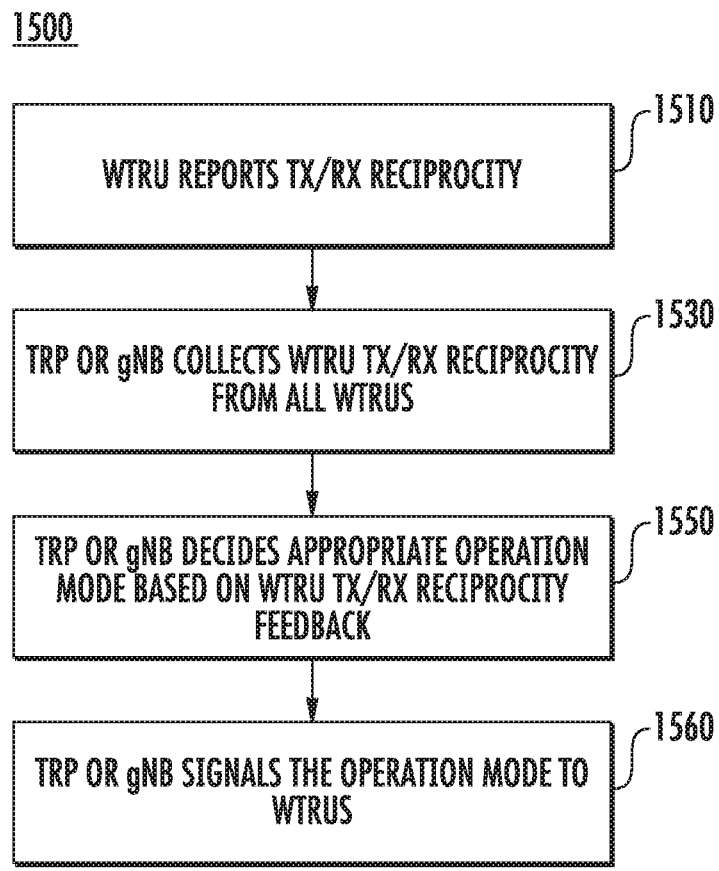
FIG. 15 is a flowchart diagram which illustrates transmission reception point (TRP) efficient operations and determining an operation mode.

FIG. 15 is a flowchart diagram which illustrates TRP efficient operations and determining an operation mode. As shown in an example in flowchart diagram 1500, a WTRU may report the TX/RX beam reciprocity back to the TRP or gNB 1510. Further, the TRP or gNB may collect a WTRU TX/RX beam reciprocity report from all WTRUs in a cell 1530. The TRP or gNB may decide on an appropriate operation mode based on the collected feedback for WTRU TX/RX beam reciprocity 1550. The TRP or gNB may signal the operation mode to the WTRUs 1560.

A simplified RACH procedure using reduced number of steps for random access may be used. A simplified RACH method may be designed as follows. A WTRU may send message X. For example, a WTRU may transmit a preamble and message 3, including an RRC connection request, a WTRU ID, or the like. Further, a gNB may send message Y. For example, a gNB may send an RAR message with an RRC connection complete message, contention resolution message, or the like.

When WTRUs send different preambles, no collision of the preambles typically occurs. Message 3 may be placed on different time/frequency resources linked to a preamble sequence index.

When WTRUs send the same preamble, a collision may occur. One or more of the Message 3s may not be decoded since they are in the same time/frequency resources. One embodiment includes using different time/frequency resources for the preamble by linking message 3 to another index. For example, time/frequency resources=f (preamble index, other index).

When WTRUs send the same preamble, sometimes a collision may not occur if one WTRU may have much stronger power than the other one or more WTRUs. In an example, Message 3 for a stronger power WTRU may be decodable. In this case, a gNB may send a PDCCH masked with a C-RNTI (which may be for the stronger power WTRU ID), and the stronger power WTRU may decode the PDCCH and a PDSCH accordingly to a received message Y. The other one or more WTRUs in a cell may not decode the PDCCH because they use different C-RNTIs (which may be weak power WTRU IDs) and thus cannot decode the PDSCH accordingly. This example approach may resolve the contention resolution issue.

In examples provided herein, multiple RA procedures may be used. In an example, a RA procedure may involve the use of a channel that may be referred to as a RA channel (RACH), for example for sending a transmission. For example, the transmission may be or may include a preamble that may, for example, initiate the RA procedure. An RA procedure may use another channel and still be consistent with the examples provided herein. A procedure may be a RA procedure when, for example, at least one transmission in the procedure may involve the random selection of at least one parameter on which the transmission may be based. For example, a RA procedure may involve the random selection of a transmission parameter. The transmission parameter may be selected, for example, from a set or pool of configured or available candidates. The transmission parameter may be a code, a preamble, a resource, such as, for example, a time and/or a frequency resource, an identity or identifier, for example, a WTRU ID, a RNTI, among others, and the like.

In examples, one or more RA procedure types may be used, for example based on a WTRU's situation. Different RA procedures may result in a different delay, for example, a connection delay or an access delay. A WTRU's situation may, for example, be a mode or a state, for example, idle, connected, suspended, or the like.

A WTRU's situation may, for example, be a capability. A WTRU's situation may, for example, be a status or a status with respect to a parameter such as timing advance. A status of a parameter may be whether or not a WTRU has a parameter. A status of a parameter may be an age of the parameter. A WTRU's situation may, for example be a status with respect to a mode such as connected mode. For example, a status, for example, with respect to a mode, may be how long since the WTRU was in a mode such as connected mode, or how long the WTRU has been asleep or in DRX mode.

In an example, a first type of RA procedure may be referred to as a full RA procedure and a second type of RA procedure may be referred to as a simplified RA procedure.

A full RA procedure may be used interchangeably with an M-stage RA procedure, a Type-1 RA procedure, a legacy RA procedure, an LTE RA procedure, a legacy contention based RA procedure, a legacy contention-free RA procedure and the like.

A simplified RA procedure may be used interchangeably used with an N-stage RA procedure, a Type-2 RA procedure, a new RA procedure, a shortened RA procedure, a low latency RA procedure, a modified RA procedure and the like.

A full RA procedure may include M, for example, M=4, stages, for example, steps, wherein a WTRU may receive or transmit, for example, a message (msg) in a stage. In an example, the WTRU may receive or transmit a message in each stage.

In an example, a msg may be transmitted by a WTRU. A msg that may be transmitted by a WTRU may be received by an eNode-B. A msg may be received by a WTRU, for example from an eNode-B. An eNode-B may be used as a non-limiting example of a node such as a base station or other network node.

In a non-limiting example, M may be 4. A WTRU may transmit a first msg, for example, Type-1 msg1, in a first stage, for example, stage 1. A WTRU may receive (or attempt to receive) a second msg, for example, Type-1 msg2, in a second stage, for example, stage 2. In a third stage, for example, stage 3, the WTRU may transmit a third msg, for example, Type-1 msg3, for example based on the received second msg. The WTRU may receive (or attempt to receive) a fourth msg, for example, Type-1 msg4) in a fourth stage, for example, stage 4). Reception of a Type-1 msg4 may finish the RA procedure.

A WTRU may receive, obtain, and/or determine one or more of the following information, for example, during, an RA procedure such as a full RA procedure. The WTRU may receive, obtain, and/or determine a temporary WTRU-ID. Also, the WTRU may receive, obtain, and/or determine a power offset value. Further, the WTRU may receive, obtain, and/or determine a timing advance value, such as, for example, an initial timing advance value. In addition, the WTRU may receive, obtain, and/or determine a coverage level. Moreover, the WTRU may receive, obtain, and/or determine a search space, such as a common search space (CSS). Additionally, the WTRU may receive, obtain, and/or determine and/or at least one configuration, for example, a high layer configuration.

In an example, a temporary WTRU-ID, for example, a C-RNTI, may be used during an active mode or state, for example, RRC connected. A temporary WTRU-ID may be used for uplink and/or downlink transmission, for example during an active state. A temporary WTRU-ID may be used interchangeably with a C-RNTI, temporary C-RNTI, T-WTRU-ID and the like. A WTRU-ID may be used interchangeably with IMSI, s-TMSI, P-WTRU-ID and the like. A WTRU-ID may include a T-WTRU-ID, a P-WTRU-ID and the like.

A power offset value, or a transmission power level, may be used, for example, by the WTRU, for an initial uplink transmission. The power offset value may be used when uplink transmission power is calculated at least for an initial, or first, uplink transmission of data or a control channel, for example, when transmitting msg3.

One or more coverage levels may be used, in examples. A coverage level may be associated with a set of RA resources or physical RA (PRA) resources. A WTRU may determine a PRA resource for transmission, for example based on a coverage level it may determine or use. An eNode-B or other receiver of a transmission from a WTRU that may use a PRA resource and may determine a coverage level of the WTRU, for example, for uplink and/or downlink transmission, based on the PRA resource.

A WTRU may receive, obtain, and/or determine a search space, for example, a CSS, of a downlink control channel that the WTRU may use for receiving, or attempting to receive, a DL control channel, for example, during a RA procedure. For example, one or more CSSs may be used or configured and a search space among the configured CSSs may be determined based on a coverage level that the WTRU may use. The coverage level may be determined, for example, by the WTRU, during RA procedure. Based on the coverage level the WTRU may use for transmission of a RA msg, the WTRU may monitor a corresponding common search space for a DL control channel that may be associated with a msg, for example, reply, from the eNode-B. The WTRU may use a determined CSS for monitoring of a DL control channel subsequent to completion of an RA procedure.

In a further example, RA resources may be resources for transmission, and/or reception, of signals, channels, and/or messages that may be associated with a RA procedure. RA resources may be or may include one or more preambles and/or one or more time/frequency resources, for example, resources in time and/or frequency.

PRA resources, for example, for a Type-1 msg1, that may be associated with a RA procedure, such as a full RA procedure, may be configured, determined, or indicated. Configuration or indication, for example, of PRA resources for a full RA procedure, may be provided in system information that may be broadcast and/or may be provided in a broadcasting channel. For example, system information may include PRA resources, for example, one or more sets of PRA resources, that may be associated with a full RA procedures.

A simplified RA procedure may have N, for example, N=2, stages, wherein a WTRU may receive or transmit a message (msg) in a stage, for example, each stage. The value of N may be less than the value of M, in an example. In another example, the value of M may be equal to or less than the value of N.

In a non-limiting example, N may be 2. A WTRU may transmit a first msg, for example, Type-2 msg1, in a first stage, for example, stage 1. A WTRU may receive, or attempt to receive, a second msg, for example, Type-2 msg2, in a second stage, for example, stage 2. Reception of a Type-2 msg2 may finish the RA procedure.

For a simplified RA procedure, a WTRU may receive, obtain, and/or determine a subset of information which may be received, obtained, and/or determined for or from a full RA procedure. For example, during or as part of a simplified RA procedure, a WTRU may receive, obtain, and/or determine a subset of information which may be received, obtained, and/or determined for or from a full RA procedure.

For example, a WTRU may obtain a T-WTRU-ID during a simplified RA procedure while the WTRU may obtain a T-WTRU-ID and timing advance value during a full RA procedure. In an example, the WTRU obtaining a T-WTRU-ID may be or may include the WTRU receiving the T-WTRU-ID. In a further example, the WTRU obtaining a T-WTRU-ID may be or may include the WTRU determining the T-WTRU-ID.

The terms obtain, receive, and determine may be used interchangeably in examples provided herein. A Type-2 msg1 may be or may include at least one of: a PRA preamble that may be reserved, configured, or determined for a simplified RA procedure; a PRA preamble with, for example, that may provide or include, information related to a WTRU-ID; a WTRU-ID; and/or a grant-less transmission such as a grant-less PUSCH, which may be a GL-PUSCH, transmission.

In an example, a PRA preamble may be a sequence. In an example, a PRA preamble may be a Zadoff-Chu sequence.

In a further example, a PRA preamble may be transmitted in one or more preamble resources. A PRA preamble may be randomly selected from a set of PRA preambles that may be configured for a simplified RA procedure.

Also, a WTRU-ID may be signalled, for example, using a UL signal that may be transmitted in a determined or known time/frequency location. The time/frequency location may be determined based on at least one of a PRA preamble, for example, that the WTRU may transmit for at least part of Type-2 msg1, and a WTRU-ID. The WTRU-ID may be at least one of T-WTRU-ID, P-WTRU-ID, a randomly selected WTRU-ID, and the like. The UL signal that may be transmitted may be determined as a function of the PRA preamble. The UL signal that may be transmitted may be a known or a fixed signal. The UL signal that may be transmitted may be a function of the WTRU-ID. The UL signal that may be transmitted may be the PRA preamble.

In an example, a WTRU-ID may be implicitly signaled. For example, a WTRU-ID may be implicitly signaled based on the determination of a PRA resource. In an example, the PRA resource may be a PRA preamble and/or time/frequency resource. For example, one or more PRA preambles and/or one or more PRA time/frequency resources may be used, determined, and/or configured for a simplified RA procedure. A WTRU may transmit a PRA preamble in a PRA time/frequency resource. A PRA preamble and/or a PRA time/frequency resource may be determined, for example, by the WTRU based on a WTRU-ID.

In a further example, a WTRU-ID may be transmitted implicitly via a determined PRA preamble or explicitly via a data resource and/or a control resource. A randomly selected WTRU-ID may include an RNTI, for example, a C-RNTI. For example, a WTRU may randomly select an RNTI within a set of RNTIs. The set of RNTIs may be reserved RNTIs and/or configured RNTIs. The set of RNTIs may not be used for RRC connected WTRUs, and/or common functions such as paging, broadcast, RAR, and the like.

A Type-2 msg1 may be or may include a grant-less transmission such as a grant-less PUSCH transmission. For example, one or more PUSCH types may be defined including a grant-less PUSCH (GL-PUSCH). A GL-PUSCH may contain at least one of a data resource, a control resource, and a preamble resource.

A GL-PUSCH, for example, for a Type-2 msg1, may be used, for example, by a WTRU, to send one or more following information. In an example, the GL-PUSCH may be used to send a PRA preamble. Further, the GL-PUSCH may be used to send a WTRU-ID. Also, the GL-PUSCH may be used to send an RRC connection request, for example, an RRC connection establishment or reestablishment request. In another example, the GL-PUSCH may be used to send a coverage level. In an addition example, the GL-PUSCH may be used to send a service type, for example, an eMBB, an mMTC, a URLLC, and the like. Moreover, the GL-PUSCH may be used to send a WTRU category or type, for example, a BL-WTRU, a CE-WTRU, a normal WTRU, or the like.

In an example, an RRC connection request may be transmitted in a data resource and/or a control resource. Further, a coverage level may be indicated, for example, implicitly, by a determined and/or used GL-PUSCH resource and/or a determined and/or used PRA resource. Also, a service type may be a service type requested, required, or needed by the WTRU.

One or more GL-PUSCH resources that may be used for msg1 may be configured. In an example, the one or more GL-PUSCH resources may be configured via higher layer signalling.

In a further example, a WTRU may receive or attempt to receive a Type-2 msg2. For example, a WTRU may monitor a downlink control information (DCI) message in a DL control channel search space for a Type-2 msg2 that may be carried in the DCI message. In an example, the control channel search space may be a common search space. A DCI message that may carry a Type-2 msg2 may be referred to as a DCI-msg2.

The DL control channel search space for a DCI-msg2 may be determined based on the uplink resource used for a Type-2 msg1 transmission. The uplink resource may be determined at least in part based on a WTRU-ID. An RNTI that may be used for a DCI-msg2 may be determined based on the uplink resource used for a Type-2 msg1 transmission and/or the WTRU-ID.

In another example, a WTRU may monitor a DCI message that may indicate a downlink data resource that may carry Type-2 msg2. A Type-2 msg2 may include an indication as to whether a Type-2 msg1 was received successfully and/or whether a simplified RA procedure has succeeded. For example, a Type-2 msg2 may include a first value, for example, 'TRUE', or a second value, for example, 'FALSE'. The first value may indicate the confirmation of a WTRU-ID. The first value may indicate the successful reception of a Type-2 msg1 that may be for a particular WTRU-ID. The second value may indicate failure of a simplified RA procedure.

In an additional example, a Type-2 msg2 may be a signal. For example, a signal may be transmitted to indicate the confirmation of a WTRU-ID that may be transmitted implicitly or explicitly by a Type-2 msg1. The signal may be transmitted to indicate successful reception of a Type-2 msg1 that may be for a particular WTRU-ID.

A Type-2 msg2 may carry at least one of following information: a timing advance value; a power offset for uplink transmission, for example, an initial uplink transmission; a contention resolution message; an RRC connection setup complete message; a WTRU-ID or confirmation of WTRU-ID that may be indicated in or by Type-2 msg1; or one or more higher layer configurations. In an example, the information may be provided as an information element. In another example, the information may be provided as part of an information element.

In an example solution, one or more types of RA procedures may be used in a cell. For example, a first RA procedure type and a second RA procedure type may be used. A first RA procedure type may be a Type-1 or full RA procedure. A second RA procedure type may be a Type-2 or simplified RA procedure. A first RA procedure type may be used when a first WTRU condition may be met and a second RA procedure type may be used when a second WTRU condition may be met.

The number of RA procedure types that may be used, for example, in a cell, may be configured, for example by an eNode-B. Two is used herein as a non-limiting example of a number of RA procedure types that may be used, configured, or indicated, for example by an eNode-B. Any other number may be used and still be consistent with the examples provided herein.

For the non-limiting example of two RA procedure types, one or two RA procedures types may be used, configured, or indicated by an eNode-B. A first, for example, Type-1, RA procedure may be used, for example, when one RA procedure type may be configured or indicated. A first, for example, Type-1, RA procedure or a second, for example, Type-2, RA procedure may be used, for example when two RA procedure types may be configured or indicated.

In an example, a WTRU may determine a RA procedure type, for example, a Type-1 or a Type-2 RA procedure, to use based on one or more of following. For example, a WTRU may determine a RA procedure type to use based on a purpose of the RA procedure, for example, initial access. Further, a WTRU may determine a RA procedure type to use based on a mode or state of the WTRU when performing the RA procedure. Also, a WTRU may determine a RA procedure type to use based on whether the WTRU is changing modes, states, or statuses, for example, from inactive status to active status, from RRC idle or suspend to RRC connected or resume. In addition, a WTRU may determine a RA procedure type to use based on whether the WTRU is using the RA procedure to change mode, state or status. Moreover, a WTRU may determine a RA procedure type to use based on a service type, for example, eMBB, URLLC, mMTC, that the WTRU may need, use, or request. Additionally, a WTRU may determine a RA procedure type to use based on a WTRU type or category.

In a further example, a WTRU may determine a RA procedure type, for example, to use, based on the purpose of the RA procedure, such as initial access. For example, a WTRU may use a first type, for example, Type-1 or full, RA procedure for initial access. A WTRU may, for example perform an initial access after a cell detection or a cell-ID determination that may be based on a cell search procedure.

In another example, a WTRU may determine a RA procedure type based on the mode, state or status of the WTRU. For example, a WTRU may determine a RA procedure type to use based on the mode, state or status of the WTRU. The terms mode, state, and status may be used interchangeably in the examples provided herein. For example, a WTRU may use a first type, for example, Type-1 or full, RA procedure or a second type, for example, Type-2 or simplified, RA procedure when switching from an inactive, for example, idle, DRX, or suspended, status to an active, for example, connected or resume, status. Use of Type-1 or Type-2 may be determined based on one or more other factors such as how long the WTRU may have been in inactive status.

In an additional example, a WTRU may determine a RA procedure type based on a service type the WTRU may use, request, need, or require. For example, a WTRU may determine a RA procedure type to use based on a service type the WTRU may use, request, need, or require. A WTRU may use a first type, for example, Type-1 or full, RA procedure, for example when a WTRU may use, request, need, or require an eMBB service type. A WTRU may use a second type, for example, Type-2 or a simplified, RA procedure, for example when a WTRU may use, request, need, or require a URLLC service type.

Further, a WTRU may determine a RA procedure type when switching from inactive status, for example, RRC idle, to active status, for example, RRC connected, based on at least one of the following: an inactive status time, a WTRU position, and/or an associated cell-ID, for example, the cell-ID of the cell with which the WTRU may communicate for the RA procedure. For example, a WTRU may determine a RA procedure type to use when switching from inactive status to active status.

In an example, if the inactive status time of a WTRU before it switches to active status is less than a predefined threshold, a second type, for example, a Type-2 or a simplified, RA procedure may be used by the WTRU. Otherwise, a first type, for example, Type-1 or full, RA procedure may be used.

In another example, if a position of a WTRU is changed less than a predefined threshold during inactive status time, a second type, for example, Type-2 or simplified, RA procedure may be used by the WTRU. Otherwise, a first type, for example, Type-1 or full, RA procedure may be used.

The WTRU position change may be derived, calculated, measured, or determined based on a difference of positions of the WTRU. For example, the difference of positions may be a difference in a position from before inactive status, for example, at or near the start of inactive status, and a current position when performing the RA procedure or when determining which RA procedure type to use. In an example, the position change may be derived, calculated, measured, or determined using GPS or observed time difference of arrival (OTDOA) data.

The WTRU position change may be derived, calculated, measured, or determined based on a change in received signal time difference (RSTD) of a signal, for example, a CRS or a PRS. A RSTD may be measured as the difference of the receive times of a signal from two cells or eNode-Bs where at least one of the cells or eNode-Bs may be a serving cell or eNode-B of the WTRU. The base value may be a value determined at or near the start of inactive status. The current value may be a value determined when performing the RA procedure or when determining which RA procedure type to use. The change may be the difference between the base value and the current value.

In an example, the WTRU position change may be derived, calculated, measured, or determined based on TX-RX time difference drift during inactive status time. In another example, instead of determining a position change, a WTRU may use a determination of change in RSTD, for example, during inactive status, to determine a RA procedure type to use. A second type, for example, Type-2 or simplified, RA procedure may be used for a determined change below a threshold. A first type, for example, Type-1 or full, RA procedure may be used for a determined change above a threshold.

In an additional example, instead of determining a position change, a WTRU may use a determination of change in TX-RX time difference or TX-RX time difference drift, for example, during inactive status, to determine a RA procedure type to use. A second type, for example, Type-2 or simplified, RA procedure may be used for a determined change below a threshold. A first type, for example, Type-1 or full, RA procedure may be used for a determined change above a threshold.

In another example, if the associated cell-ID is different before and after inactive status, the WTRU may use a first type, for example, a Type-1 or a full, RA procedure. In an example, the associated cell-ID may be the cell-ID of the serving cell with which the WTRU may perform a RA procedure.

A WTRU may determine a RA procedure type according to one or more of the embodiments or examples described herein. Further, the WTRU may perform the determined RA procedure.

Figure 16:
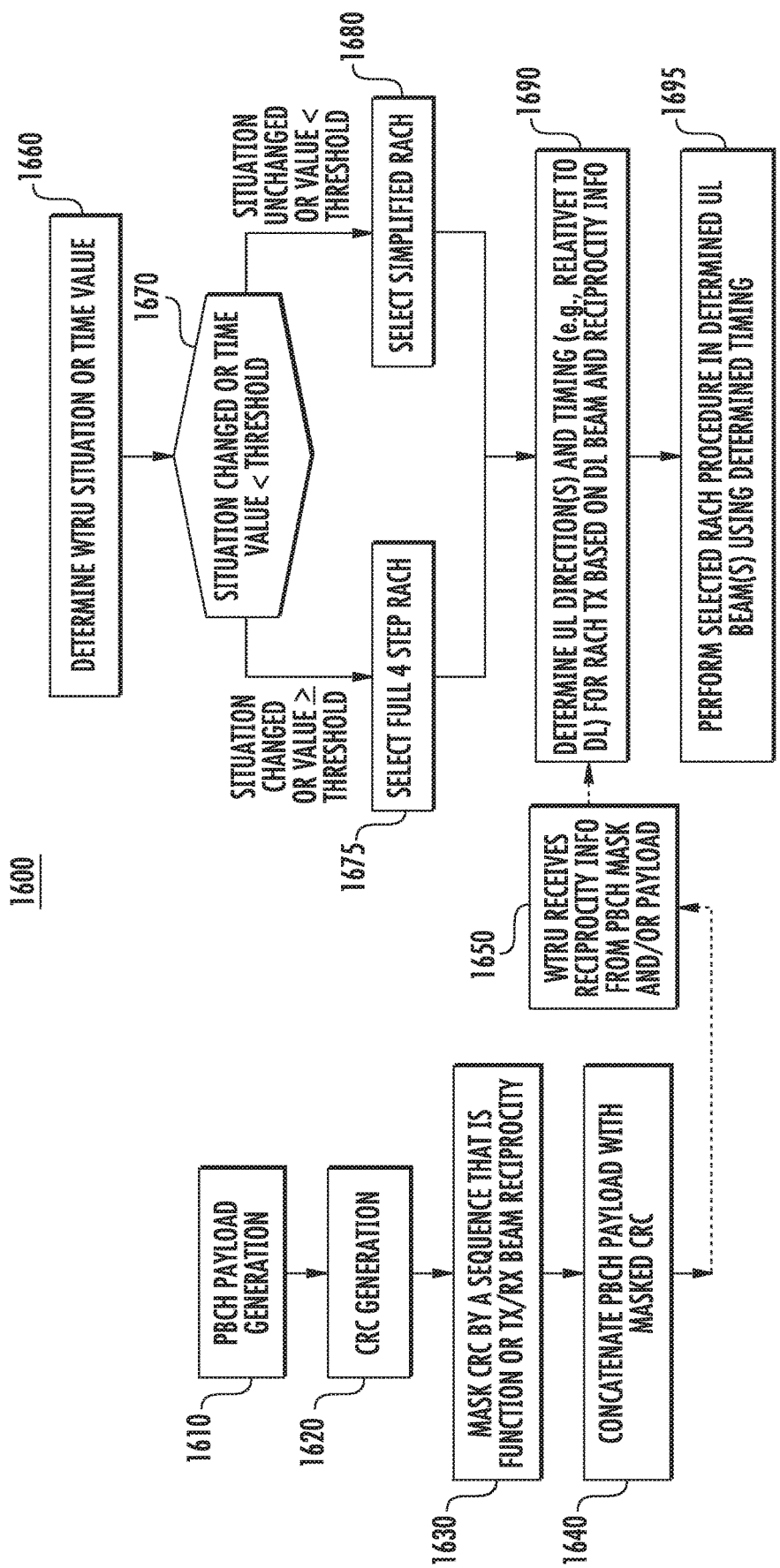
FIG. 16 is a flowchart diagram which illustrates an example method and procedure for beam reciprocity based random access.

FIG. 16 is a flowchart diagram which illustrates an example method and procedure for beam reciprocity based random access. Examples shown in flowchart diagram 1600 may also illustrate beam correspondence based random access method and procedure. Beam reciprocity or beam correspondence may be indicated by a PBCH with a mask with additional details, for example, RACH timing, in a PBCH payload. For example, a gNB may generate a PBCH payload 1610. Also, the gNB may generated a CRC 1620. Further, the gNB may mask the generated CRC with a sequence that is a function of TX/RX reciprocity 1630. The PBCH payload may then be concatenated by the gNB with the masked CRC 1640. The gNB may then transmit the PBCH payload concatenated by the gNB with the masked CRC. As a result, a WTRU may receive beam reciprocity or beam correspondence information indicated by the PBCH with a mask, the PBCH payload or both 1650.

In addition, a WTRU may determine a situation the WTRU or a time value of the WTRU. The WTRU may determine, for example, a position, beam RSRP, cell ID, state, time since last TA, time in state, or the like. Based on the situation of the WTRU and/or a time value of the WTRU, for example, situation unchanged, situation change or time value less than a threshold, the WTRU may select different random access methods and procedures 1670. For example, the WTRU may select as 4-step or 2-step random access methods and procedures, or full random or simplified random access methods and procedures. In an example, when a situation of the WTRU is changed, or when a value is greater than or equal to a threshold, the WTRU may select the full four step RACH procedure 1675. In an example, the situation of the WTRU may refer to a position of the WTRU, a beam RSRP, a cell ID, a state of the WTRU, a value of the WTRU with respect to a threshold and the like. Further, when the situation is changed or when a value is less than a threshold, the WTRU may select the simplified RACH procedure 1680. In an example, the simplified RACH procedure may be a two step RACH procedure.

The indicated beam reciprocity or beam correspondence information received by the WTRU may be used to determine one or more UL directions and timing for RACH based on a DL beam and beam reciprocity or beam correspondence information 1690. In an example, the one or more UL directions and timing may be relative to a DL beam.

The WTRU may perform a selected RACH procedure in determined one or more UL beams based on beam reciprocity information using the determined timing 1695, or the like.

Although the example solutions described herein consider LTE, LTE-A, NR or 5G specific protocols, it is understood that the solutions described herein are not restricted to such protocols or scenarios and are applicable to other wireless systems or other wireless technologies as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a wireless transmit/receive unit (WTRU), the method comprising:
   receiving, from a base station, information concerning an association between a plurality of synchronization signal/physical broadcast channel (SS/PBCH) block transmissions and a plurality of physical random access channel (PRACH) resources, wherein each of the plurality of SS/PBCH block transmissions is associated with a transmission beam of the base station;
   receiving the plurality of SS/PBCH block transmissions;
   comparing a reference signal received power (RSRP) associated with one of the plurality of the SS/PBCH block transmissions to a threshold;
   determining between random access procedure of a first type and a random access procedure of a second type based on the comparison;
   selecting a PRACH resource based on the one of the plurality of the SS/PBCH block transmissions and the information concerning the association between the plurality of SS/PBCH block transmissions and the plurality of PRACH resources; and
   transmitting a PRACH preamble, for the determined random access procedure of the first type or random access procedure of the second type, using the selected PRACH resource.

2. The method of claim 1, wherein the random access procedure of the first type is a four-step random access procedure and the random access procedure of the second type is a two-step random access procedure.

3. The method of claim 2, wherein the two-step random access procedure includes a first step including transmitting a physical uplink shared channel (PUSCH) transmission and a second step including receiving a message in a control channel search space.

4. The method of claim 3, wherein the PUSCH transmission is a grant-less PUSCH transmission.

5. The method of claim 3, wherein the PUSCH transmission includes a radio resource control (RRC) connection request.

6. The method of claim 3, wherein the first step of the two-step random access procedure further includes the transmission of the PRACH preamble.

7. The method of claim 2, wherein the four-step random access procedure includes a first step including transmitting a random access preamble, a second step including receiving a random access response, a third step including transmitting a PUSCH transmission and a fourth step including receiving a contention resolution message.

8. The method of claim 1, wherein the plurality of PRACH resources include one or more of PRACH preamble sequences, time resources and frequency resources.

9. The method of claim 1, further comprising determining an SS/PBCH block time index for the one of the plurality of the SS/PBCH block transmissions.

10. The method of claim 1, further comprising determining a transmission beam for uplink transmission based on the one of the plurality of the SS/PBCH block transmissions.

11. The method of claim 10, wherein the PRACH preamble is transmitted using the determined transmission beam.

12. A wireless transmit/receive unit (WTRU) comprising:
    a transceiver; and
    a processor operatively coupled to the transceiver; wherein:
       the transceiver is configured to receive, from a base station, information concerning an association between a plurality of synchronization signal/physical broadcast channel (SS/PBCH) block transmissions and a plurality of physical random access channel (PRACH) resources, wherein each of the plurality of SS/PBCH block transmissions is associated with a transmission beam of the base station;
       the transceiver is configured to receive the plurality of SS/PBCH block transmissions;
       the processor is configured to compare a reference signal received power (RSRP) associated with one of the plurality of the SS/PBCH block transmissions to a threshold;
       the processor is configured to determine between a random access procedure of a first type and a random access procedure of a second type based on the comparison;
       the processor is configured to select a PRACH resource based on the one of the plurality of the SS/PBCH block transmissions and the information concerning the association between the plurality of SS/PBCH block transmissions and the plurality of PRACH resources; and
       the transceiver is configured to transmit a PRACH preamble, for the determined random access procedure of the first type or random access procedure of the second type, using the selected PRACH resource.

13. The WTRU of claim 12, wherein the random access procedure of the first type is a four-step random access procedure and the random access procedure of the second type is a two-step random access procedure.

14. The WTRU of claim 13, wherein the two-step random access procedure includes a first step including transmitting a physical uplink shared channel (PUSCH) transmission and a second step including receiving a message in a control channel search space.

15. The WTRU of claim 14, wherein the PUSCH transmission is a grant-less PUSCH transmission.

16. The WTRU of claim 14, wherein the PUSCH transmission includes a radio resource control (RRC) connection request.

17. The WTRU of claim 14, wherein the first step of the two-step random access procedure further includes the transmission of the PRACH preamble.

18. The WTRU of claim 13, wherein the four-step random access procedure includes a first step including transmitting a random access preamble, a second step including receiving a random access response, a third step including transmitting a PUSCH transmission and a fourth step including receiving a contention resolution message.

19. The WTRU of claim 12, wherein the plurality of PRACH resources include one or more of PRACH preamble sequences, time resources and frequency resources.

20. The WTRU of claim 12, wherein the processor is further configured to determine a SS/PBCH block time index for the one of the plurality of the SS/PBCH block transmissions.

21. The WTRU of claim 12, wherein the processor is further configured to determine a transmission beam for uplink transmission based on the one of the plurality of the SS/PBCH block transmissions.

22. The WTRU of claim 21, wherein the PRACH preamble is transmitted using the determined transmission beam.

* * * * *